(12) United States Patent
Matsuda

(10) Patent No.: US 8,717,388 B2
(45) Date of Patent: May 6, 2014

(54) COMMUNICATION CONTROL DEVICE, COMMUNICATION CONTROL METHOD, AND PROGRAM

(75) Inventor: Kouichi Matsuda, Tokyo (JP)

(73) Assignee: Sony Corporation, Tokyo (JP)

( * ) Notice: Subject to any disclaimer, the term of this patent is extended or adjusted under 35 U.S.C. 154(b) by 646 days.

(21) Appl. No.: 13/009,542

(22) Filed: Jan. 19, 2011

(65) Prior Publication Data

US 2011/0187725 A1    Aug. 4, 2011

(30) Foreign Application Priority Data

Feb. 4, 2010    (JP) ................................ P2010-022973

(51) Int. Cl.
*G06T 13/00*    (2011.01)
*G06T 17/00*    (2006.01)
*G06T 19/00*    (2011.01)

(52) U.S. Cl.
USPC .......................................................... 345/633

(58) Field of Classification Search
CPC ..................................................... G06T 19/006
USPC .......................................................... 345/633
See application file for complete search history.

(56) References Cited

U.S. PATENT DOCUMENTS

2009/0054108 A1*  2/2009  Kito .............................. 455/566
2009/0244015 A1* 10/2009  Sengupta et al. ............. 345/173

FOREIGN PATENT DOCUMENTS

| JP | 2001-142825 |   | 5/2001  |
|----|-------------|---|---------|
| JP | 2003-152615 A | * | 5/2003  |
| JP | 2004-080363 A | * | 3/2004  |
| JP | 2008-299619 A | * | 12/2008 |
| JP | 2008-304268 |   | 12/2008 |

OTHER PUBLICATIONS

Notification of Reasons for Refusal for JP2010-22973, Japanese Patent Office, Jul. 31, 2013, translated and downloaded 18:40:05 JST Aug. 28, 2013.*
Search Report by Registered Searching Organization for JP2010-22973, Japanese Patent Office, Jul. 30, 2013, translated and downloaded 01:06:23 JST Aug. 28, 2013.*
Davison, "Real-Time Simultaneous Localization and Mapping with a Single Camera", Proceedings of the $9^{th}$ IEEE International Conference on Computer Vision vol. 2, pp. 1-8, (2003).

* cited by examiner

Primary Examiner — Jeffery A Brier
(74) Attorney, Agent, or Firm — Sherr & Jiang, PLLC

(57) ABSTRACT

There is provided a communication control device including: a data storage unit storing feature data representing features of appearances of one or more communication devices; an environment map building unit for building an environment map representing positions of communication devices present in a real space based on an input image obtained by imaging the real space and the feature data stored in the data storage unit; a detecting unit for detecting a user input toward a first communication device designating any data provided in the first communication device and a direction; a selecting unit for selecting a second communication device serving as a transmission destination of the designated data from the environment map based on the direction designated by the user input; and a communication control unit for transmitting the data provided in the first communication device from the first communication device to the second communication device.

17 Claims, 18 Drawing Sheets

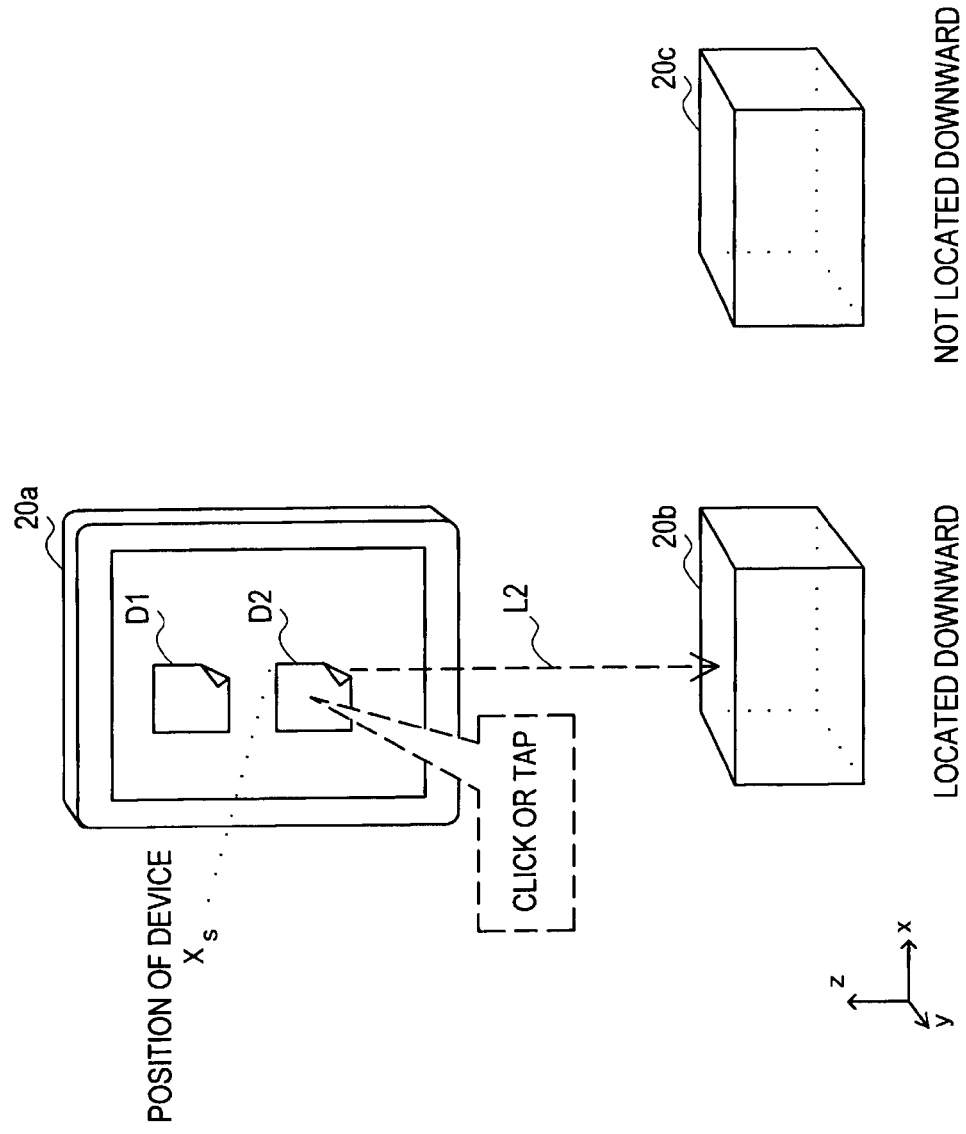

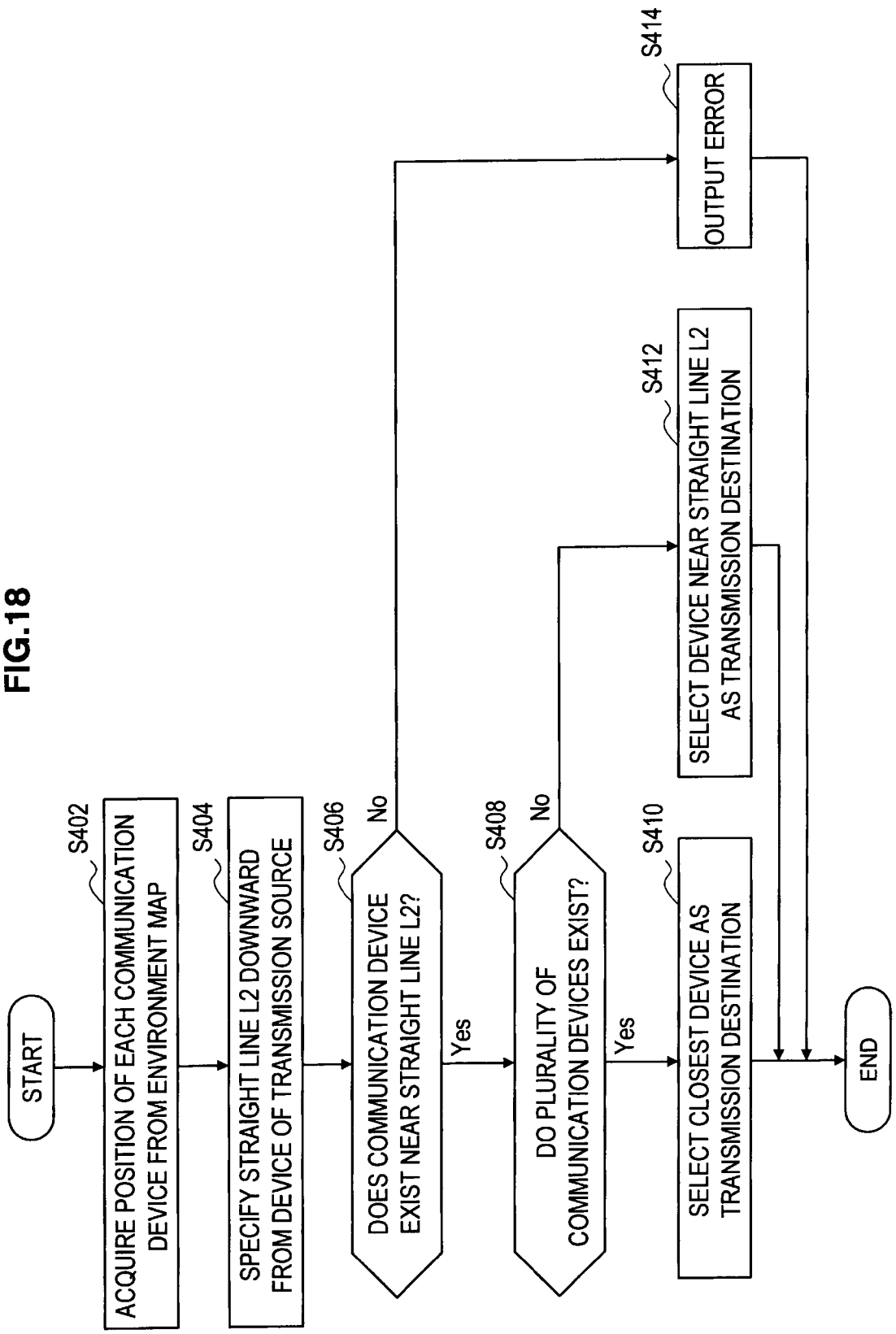

COMMUNICATION CONTROL DEVICE, COMMUNICATION CONTROL METHOD, AND PROGRAM

BACKGROUND OF THE INVENTION

1. Field of the Invention

The present invention relates to a communication control device, a communication control method, and a program.

2. Description of the Related Art

Recently, technology called augmented reality (AR), which processes an image obtained by imaging a real space and presents the processed image to a user, has been receiving attention. In the AR technology, it is important that a computer recognize a situation of the real space. For example, as technology for recognizing the situation of the real space, Japanese Patent Laid-Open Publication No. 2008-304268 discloses a method of dynamically generating an environment map representing three-dimensional positions of physical objects present in the real space by applying technology called simultaneous localization and mapping (SLAM) capable of simultaneously estimating a position and a posture of a camera and positions of feature points present in an image of the camera. A basic principle of the SLAM technology using a monocular camera is disclosed in "Real-Time Simultaneous Localization and Mapping with a Single Camera" (Andrew J. Davison, Proceedings of the 9th IEEE International Conference on Computer Vision Volume 2, 2003, pp. 1403-1410).

Incidentally, information communication technology is widely used between general users at present, and many users have a plurality of communication devices communicable with each other. For example, print data transmission from a personal computer (PC) to a printer, image data transmission from a digital camera to a PC, a data exchange between a desktop PC and a mobile phone, a connection data exchange between wireless devices, and the like are all communication between communication devices communicable with each other. For example, technology for improving convenience of users upon communication between the communication devices is disclosed in Japanese Patent Laid-Open Publication No. 2001-142825.

SUMMARY OF THE INVENTION

In general, when data is exchanged between the above-described communication devices, the user designates desired transmission data and a device of a communication partner on a screen of any one of a transmission source and a transmission destination, and issues a data transmission command. As a method of issuing the data transmission command, there are various types such as an icon dragging, menu selection, a text-based command input, and the like. However, the user should know an address, an identification name, or an icon representing the communication partner device in any method. This makes user's operation complicated and prevents the user from performing an intuitive manipulation. "Pick and Drop" disclosed in the above-described Japanese Patent Laid-Open Publication No. 2001-142825 is a method directed to a data exchange between devices with an intuitive user interface. However, since a special interface should be prepared in the devices of both the transmission source and the transmission destination for the "Pick and Drop" method, the user may not enjoy sufficient convenience.

Meanwhile, the above-described environment map enables a computer to accurately recognize a position of a communication device located in a real space. Thus, it is expected that a data transmission instruction can be more intuitively provided between devices by a user interface to which the environment map is applied.

In light of foregoing, it is desirable to provide a novel and improved communication device, a communication control method, and a program that provide an intuitive user interface for data transmission between devices by applying an environment map.

According to an embodiment of the present invention, there is provided a communication control device including: a data storage unit storing feature data representing features of appearances of one or more communication devices; an environment map building unit for building an environment map representing positions of communication devices present in a real space on the basis of an input image obtained by imaging the real space and the feature data stored in the data storage unit; a detecting unit for detecting a user input toward a first communication device designating any data provided in the first communication device and a direction; a selecting unit for selecting a second communication device serving as a transmission destination of the designated data from the environment map on the basis of the direction designated by the user input; and a communication control unit for transmitting the data provided in the first communication device to the second communication device from the first communication device.

According to this configuration, the environment map representing the positions of the communication devices located in the real space is dynamically built on the basis of the input image obtained by imaging the real space. When the user input toward the first communication device of a data transmission source is detected, designated data is transmitted from the first communication device to the second communication device selected from the environment map on the basis of the direction designated by the user input.

The selecting unit may select a communication device located in the direction designated by the user input with respect to the first communication device in the environment map as the second communication device.

The selecting unit may specify one straight line having a start point at the first communication device on the basis of a position and a posture of the first communication device in the environment map and the direction designated by the user input, and select a communication device located at least near the straight line as the second communication device.

If a plurality of communication devices are located in the direction designated by the user input with respect to the first communication device in the environment map, the selecting unit may select a communication device located nearest the first communication device among the plurality of communication devices as the second communication device.

The communication control device may further include a display control unit for causing a display device to display an animation representing data transmission when the data is transmitted from the first communication device to the second communication device.

The user input may be dragging an icon displayed on a screen provided in the first communication device and the data to be transmitted from the first communication device may be specified according to which icon is dragged by a user.

According to another embodiment of the present invention, there is provided a communication control method by a communication control device including a storage medium storing feature data representing features of appearances of one or more communication devices, including the steps of: building an environment map representing positions of communication devices present in a real space on the basis of an input image obtained by imaging the real space and the feature data; detecting a user input toward a first communication device designating any data provided in the first communication device and a direction; selecting a second communication device serving as a transmission destination of the designated data from the environment map on the basis of the direction designated by the user input; and transmitting the data provided in the first communication device from the first communication device to the second communication device.

According to another embodiment of the present invention, there is provided a program for causing a computer, which controls a communication control device including a storage medium storing feature data representing features of appearances of one or more communication devices, to function as: an environment map building unit for building an environment map representing positions of communication devices present in a real space on the basis of an input image obtained by imaging the real space and the feature data stored in the data storage unit; a detecting unit for detecting a user input toward a first communication device designating any data provided in the first communication device and a direction; a selecting unit for selecting a second communication device serving as a transmission destination of the designated data from the environment map on the basis of the direction designated by the user input; and a communication control unit for transmitting the data provided in the first communication device from the first communication device to the second communication device.

According to another embodiment of the present invention, there is provided a communication control device including: a data storage unit storing feature data representing features of appearances of one or more communication devices; an environment map building unit for building an environment map representing positions of communication devices present in a real space on the basis of an input image obtained by imaging the real space and the feature data stored in the data storage unit; a detecting unit for detecting a user input toward a first communication device designating any data provided in the first communication device; a selecting unit for selecting a second communication device serving as a transmission destination of the designated data from the environment map on the basis of a position of the first communication device in the environment map; and a communication control unit for transmitting the data provided in the first communication device from the first communication device to the second communication device.

The selecting unit may select a communication device located below the first communication device in the environment map as the second communication device.

According to another embodiment of the present invention, there is provided a communication control method by a communication control device including a storage medium storing feature data representing features of appearances of one or more communication devices, including the steps of: building an environment map representing positions of communication devices present in a real space on the basis of an input image obtained by imaging the real space and the feature data; detecting a user input toward a first communication device designating any data provided in the first communication device; selecting a second communication device serving as a transmission destination of the designated data from the environment map on the basis of a position of the first communication device in the environment map; and transmitting the data provided in the first communication device from the first communication device to the second communication device.

According to another embodiment of the present invention, there is provided a program for causing a computer, which controls a communication control device including a storage medium storing feature data representing features of appearances of one or more communication devices, to function as: an environment map building unit for building an environment map representing positions of communication devices present in a real space on the basis of an input image obtained by imaging the real space and the feature data stored in the data storage unit; a detecting unit for detecting a user input toward a first communication device designating any data provided in a first communication device; a selecting unit for selecting a second communication device serving as a transmission destination of the designated data from the environment map on the basis of a position of the first communication device in the environment map; and a communication control unit for transmitting the data provided in the first communication device from the first communication device to the second communication device.

According to the communication control device, the communication control method, and the program according to embodiments of the present invention as described above, an intuitive user interface for data transmission between devices can be provided.

BRIEF DESCRIPTION OF THE DRAWINGS

FIG. 17 is an illustrative diagram illustrating the selection of a transmission destination according to a modified example;

FIG. 18 is a flowchart showing an example of a flow of a transmission destination selection process according to a modified example.

DETAILED DESCRIPTION OF THE EMBODIMENT(S)

Figure 1:
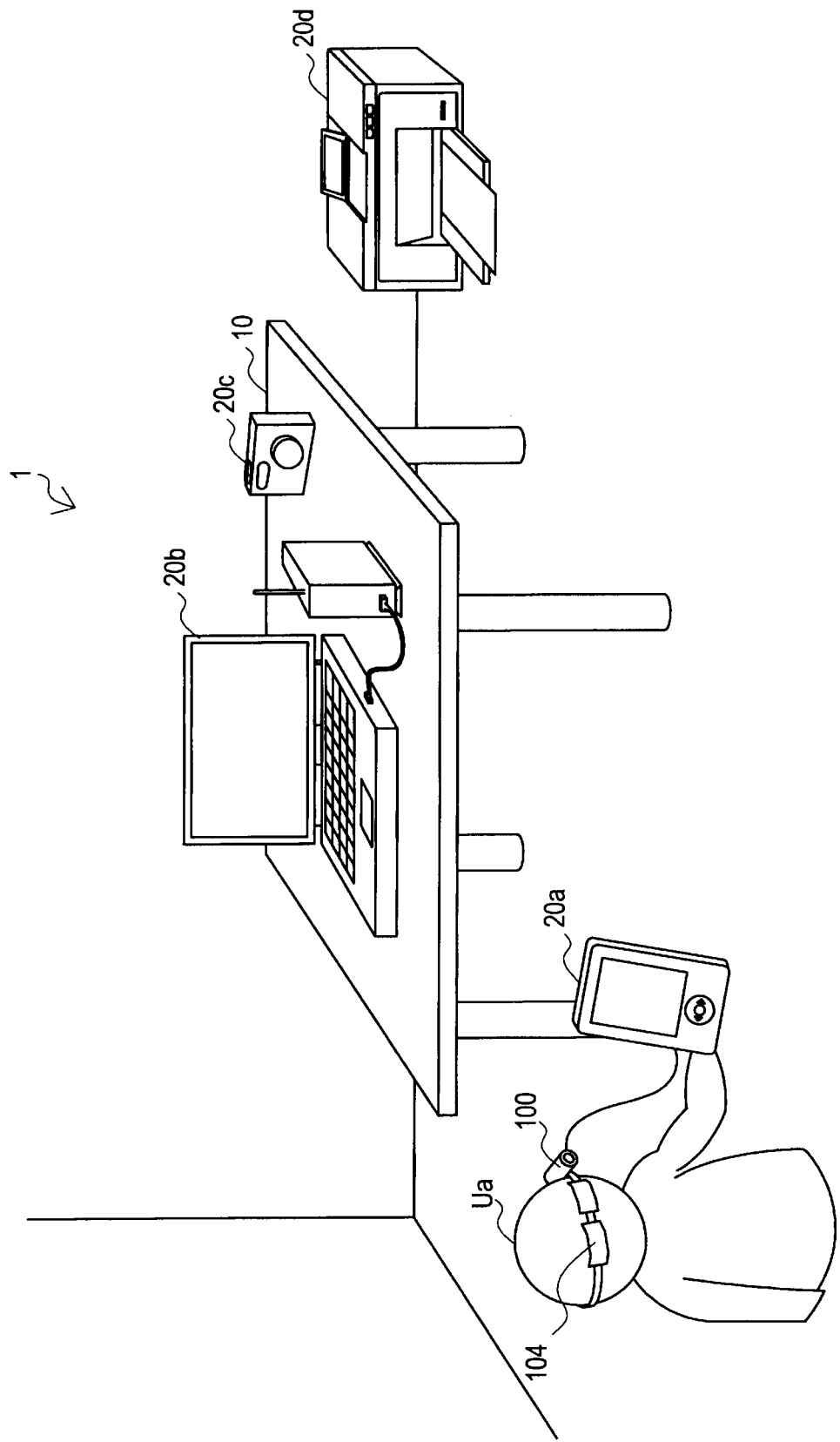
FIG. 1 is a schematic diagram illustrating an overview of a system according to an embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The "detailed description of the embodiment(s)" will be given in the following order.

1. Overview of System
2. Configuration of Communication Device according to Embodiment
3. Configuration of Communication Control Device according to Embodiment
   3-1. Imaging Unit
   3-2. Environment Map Generating Unit
   3-3. Communication Processing Unit
   3-4. Display Control Unit
   3-5. Flow of Communication Control Process
4. Modified Examples
5. Summary <1. Overview of System>

Figure 2:
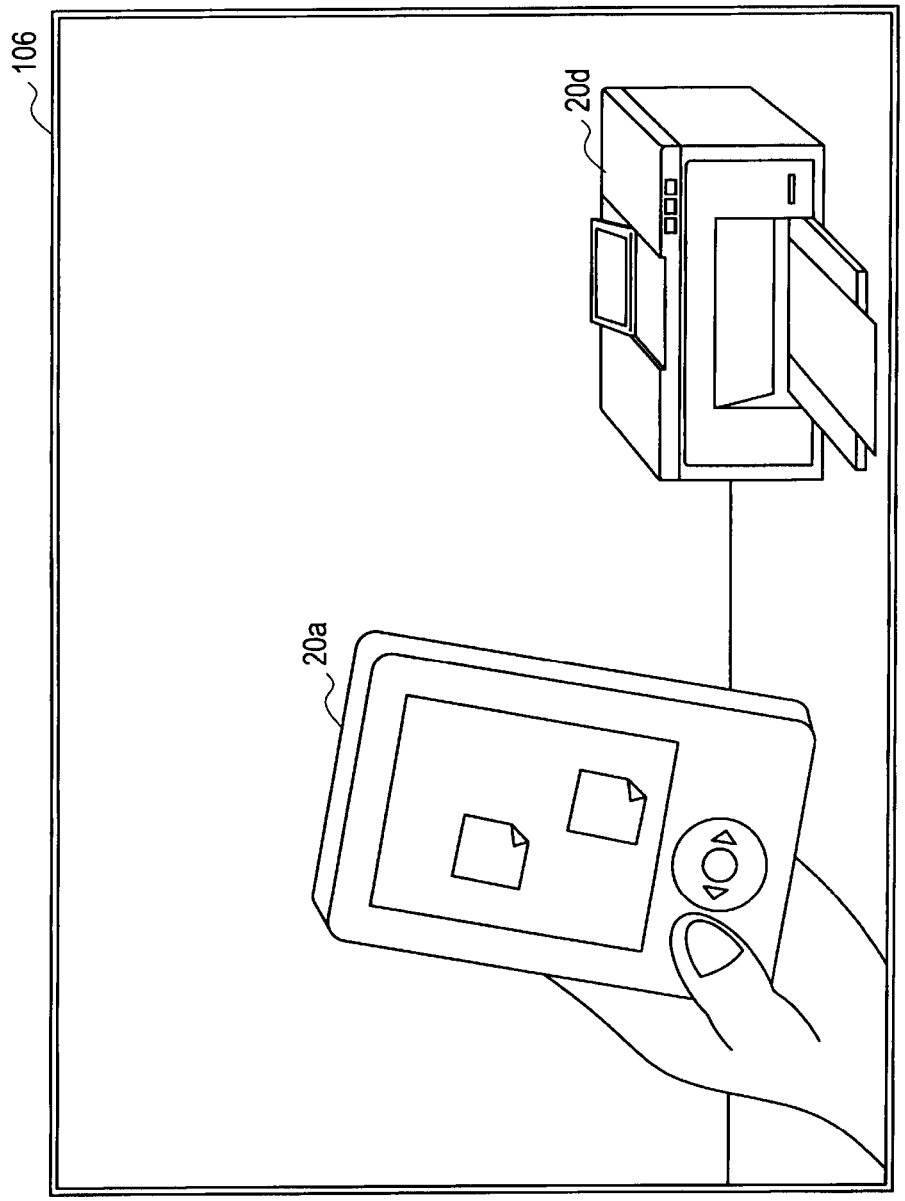
FIG. 2 is an illustrative diagram showing an example of an input image acquired in a communication control device according to an embodiment.

First, the overview of the system according to an embodiment of the present invention will be described with reference to FIGS. 1 and 2. FIG. 1 is a schematic diagram illustrating the overview of the system according to the embodiment of the present invention. FIG. 2 is an illustrative diagram showing an example of an input image capable of being acquired in a communication control device 100 according to the embodiment illustrated in FIG. 1.

Referring to FIG. 1, an environment 1 is shown as an example in which the communication control device 100 may be used. A table 10 and communication devices 20a, 20b, 20c, and 20d are present inside the environment 1. The table 10 is installed on a floor, which is the bottom of the environment 1. For example, the communication device 20a corresponds to a mobile phone such as a smart phone or the like, and is held by a user. For example, the communication device 20b corresponds to a notebook PC, and is located on the table 10. For example, the communication device 20c corresponds to a digital camera, and is located on the table 10. For example, the communication device 20d corresponds to a printer, and is installed on the floor. The communication devices 20a, 20b, 20c, and 20d can communicate with each other via a wired or wireless communication connection.

The communication control device 100 is a communication device having a camera and a head mounted display (HMD) 104 mounted on a user Ua. A main body of the communication control device 100 may not necessarily be mounted on the user Ua. The communication control device 100 can communicate with the communication devices 20a, 20b, 20c, and 20d via a wired or wireless communication connection. The communication control device 100 images the environment 1 as an example shown in FIG. 1 and acquires a set of input images. The communication control device 100 builds an environment map to be described later on the basis of the acquired input images. The communication control device 100 detects a user input related to data transmission to any one of the communication devices 20a, 20b, 20c, and 20d. The communication control device 100 controls data transmission from one device to another device on the basis of the detected user input.

FIG. 2 is an illustrative view showing an input image 106 as an example acquired by the communication control device 100. Referring to FIG. 2, the communication devices 20a and 20d shown in FIG. 1 are shown in the input image 106. Two icons corresponding to data provided in the communication device 20a are displayed on a screen of the communication device 20a. In this embodiment, for example, data is transmitted from the communication device 20a to another communication device under control of the communication control device 100 by the user Ua performing a user input to be described later on the icon.

In this specification, the communication devices 20a, 20b, 20c, and 20d are collectively referred to as the communication devices 20 by omitting letters of their reference symbols when there is no particular need to distinguish among them. The same applies to other elements.

<2. Configuration of Communication Device According to Embodiment>

Figure 3:
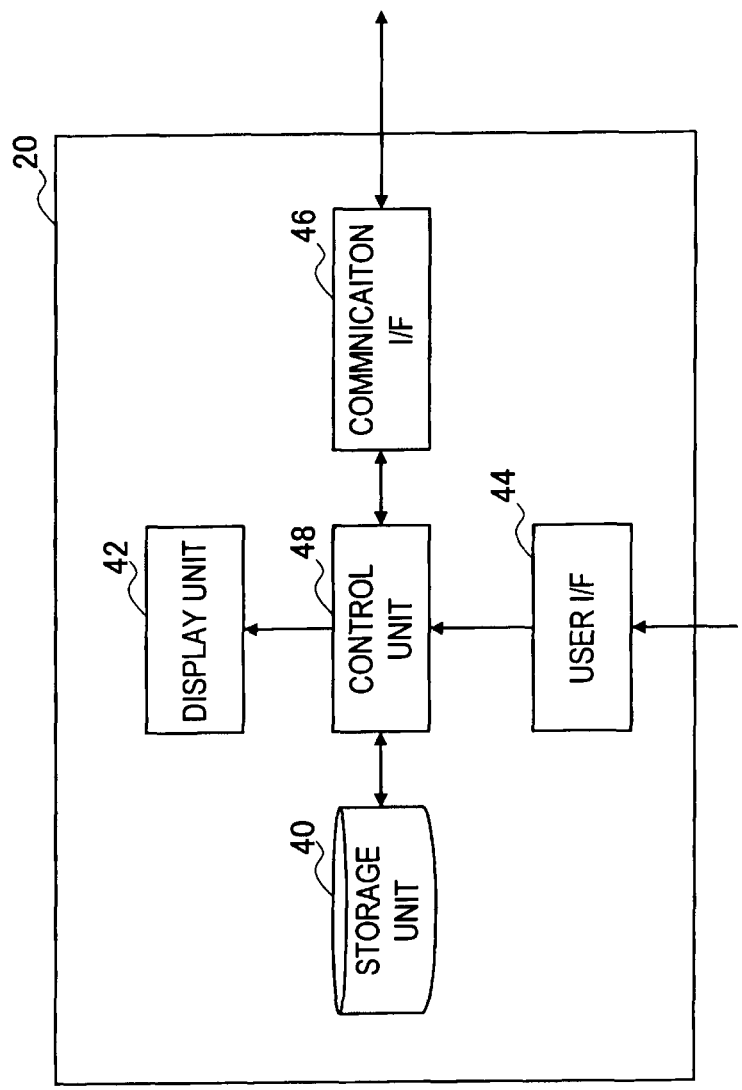
FIG. 3 is a block diagram showing an example of a configuration of a communication device according to an embodiment.

FIG. 3 is a block diagram showing an example of a configuration of the communication device 20 according to an embodiment of the present invention. Referring to FIG. 3, the communication device 20 includes a storage unit 40, a display unit 42, a user interface (I/F) 44, a communication I/F 46, and a control unit 48.

The storage unit 40 stores data using a storage medium such as a hard disk or a semiconductor memory. The data stored by the storage unit 40 may be any type of data such as application data, text data, image data, audio data, or program data.

The display unit 42 displays information on a screen provided on the communication device 20 according to control by the control unit 48. For example, as illustrated in FIG. 2, the display unit 42 displays icons respectively corresponding to data stored in the storage unit 40 on the screen. The display unit 42 may display a list of file names of data files storing individual data stored in the storage unit 40. The icons or file names are used to specify data to be transmitted when the user desires to transmit the data from the communication device 20 to another device.

The user I/F 44 provides an input means for allowing the user to input information or to give an instruction. In this embodiment, the user I/F 44 includes a pointing device, which enables the user to designate any position on the screen of the communication device 20. For example, the pointing device may be a touch panel configured integrally with the display unit 42, or may be a mouse, a touch pad, or the like in place thereof. Further, the user I/F 44 may additionally include a keyboard, a button, a wheel, or the like.

The communication I/F 46 intermediates communication with other devices (including the communication control device 100 and another communication device 20) by the communication device 20. For example, the communication I/F 46 may be a wireless communication interface such as a wireless local area network (LAN), Bluetooth (registered trademark), or WiMax (registered trademark), or may be a wired communication interface such as a wired LAN or a universal serial bus (USB).

The control unit 48 controls an entire operation of the communication device 20 by using a processor such as a central processing unit (CPU) or a digital signal processor (DSP). For example, the control unit 48 operates unique functions of the communication device 20 (an information processing function of a PC, a communication function of a smart phone, or other application functions). For example, the control unit 48 causes the display unit 41 to display icons and the like respectively corresponding to data stored in the storage unit 40. In this embodiment, for example, when a predetermined user input related to data transmission via the user I/F 44 is sensed, the control unit 48 transmits a user input signal of notification of content of the user input to the communication control device 100 via the communication I/F 46. The user input related to the data transmission will be specifically described later.

The control unit 48 reads data designated by the user from the storage unit 40 according to an instruction from the communication control device 100, and transmits the data to another communication device via the communication I/F 46. For example, the transmission of data from the communication device 20 can be realized by a structure of file transfer protocol (FTP), hyper-text transfer protocol (HTTP), Samba, or the like. A data transmission destination is selected by the communication control device 100.

The communication control device 100 is a device for controlling data transmission from the communication device 20 to another communication device. The configuration of the communication control device 100 according to this embodiment will be specifically described in the next section.

<3. Configuration of Communication Control Device According to Embodiment>

Figure 4:
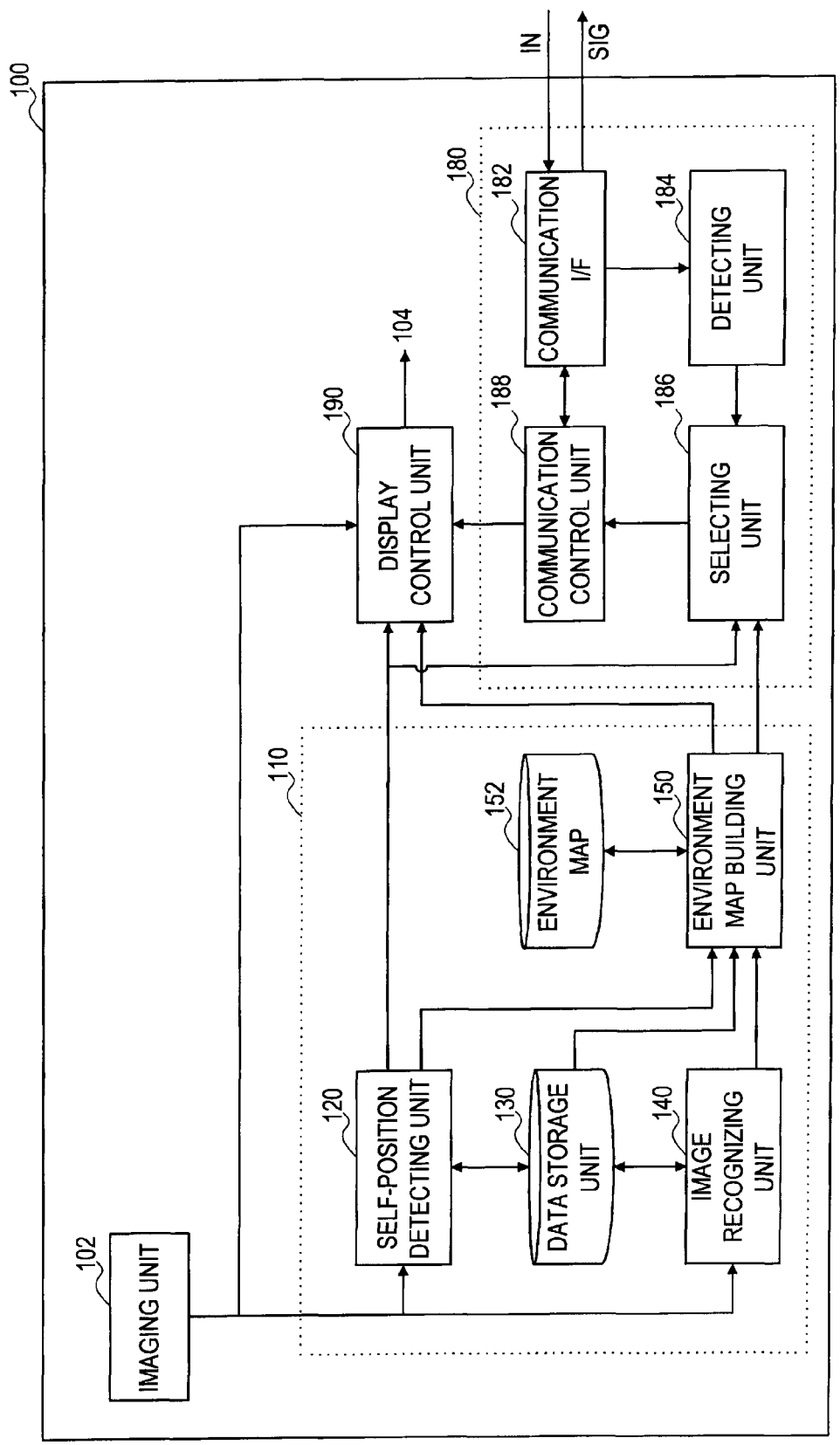
FIG. 4 is a block diagram showing an example of a configuration of the communication control device according to an embodiment.

FIG. 4 is a block diagram showing an example of a configuration of the communication control device 100 according to an embodiment of the present invention. Referring to FIG. 4, the communication control device 100 includes an imaging unit 102, an environment map generating unit 110, a communication processing unit 180, and a display control unit 190.

[3-1. Imaging Unit]

For example, the imaging unit 102 may be realized as a camera having an imaging element such as a charge coupled device (CCD) or a complementary metal oxide semiconductor (CMOS). The imaging unit 102 may be provided outside the communication control device 100. The imaging unit 102 outputs an image generated by imaging the real space such as the environment 1 illustrated in FIG. 1 to the environment map generating unit 110 and the display control unit 190 as the input image.

[3-2. Environment Map Generating Unit]

The environment map generating unit 110 generates an environment map, which represents positions of one or more physical objects present in the real space and the like based on the input image input from the imaging unit 102 and feature data of an object to be described later stored by a data storage unit 130. In this embodiment as illustrated in FIG. 4, the environment map generating unit 110 includes a self-position detecting unit 120, the data storage unit 130, an image recognizing unit 140, an environment map building unit 150, and an environment map storage unit 152.

(1) Self-Position Detecting Unit

The self-position detecting unit 120 dynamically detects a position of the camera showing the input image on the basis of the input image input from the imaging unit 102 and the feature data stored in the data storage unit 130. For example, even when the imaging device has a monocular camera, the self-position detecting unit 120 may dynamically determine a position and a posture of the camera and a position of an FP on an imaging plane of the camera for each frame by applying the SLAM technology disclosed in the above-described "Real-Time Simultaneous Localization and Mapping with a Single Camera" (Andrew J. Davison, Proceedings of the 9th IEEE International Conference on Computer Vision Volume 2, 2003, pp. 1403-1410).

First, the entire flow of a self-position detection process by the self-position detecting unit 120 to which the SLAM technology is applied will be described with reference to FIG. 5. Next, the self-position detection process will be described in detail with reference to FIGS. 6 to 8.

Figure 5:
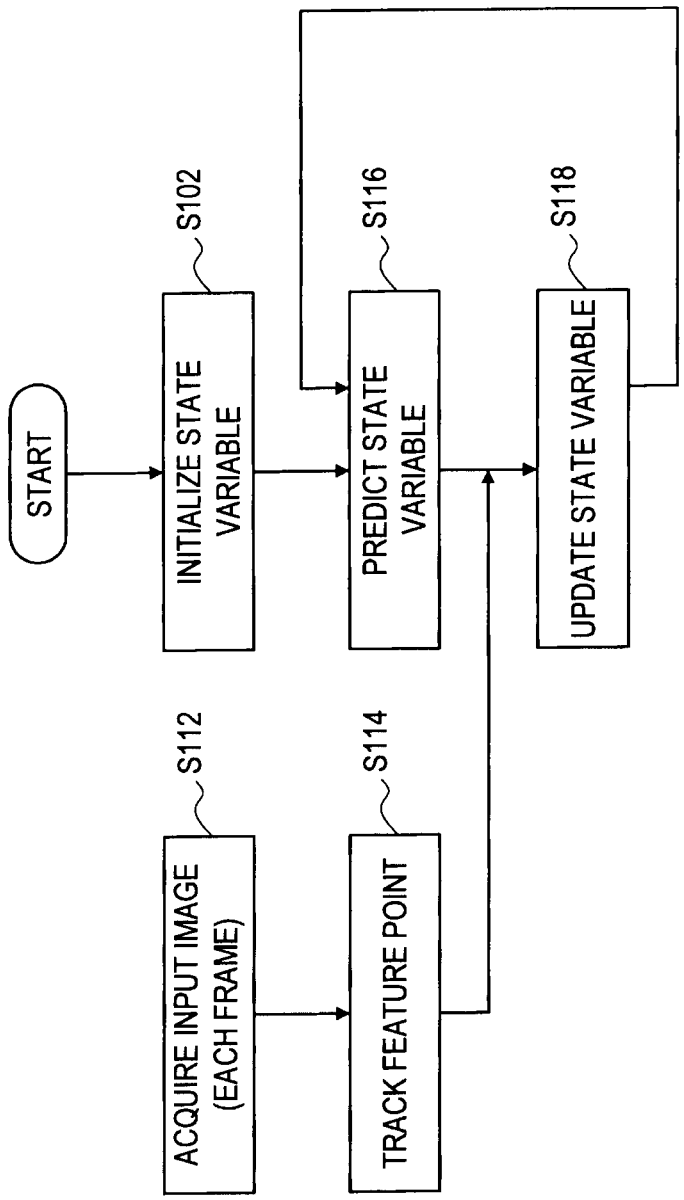
FIG. 5 is a flowchart showing an example of a flow of a self-position detection process according to an embodiment.

FIG. 5 is a flowchart illustrating an example of the flow of the self-position detection process by the self-position detecting unit 120 to which the SLAM technology is applied. In FIG. 5, when the self-position detection process starts, the self-position detecting unit 120 first initializes a state variable (step S102). In this embodiment, the state variable is a vector including a position and a posture (rotation angle) of the camera, a moving speed and an angular speed of the camera and positions of one or more FPs as elements. The self-position detecting unit 120 then sequentially obtains the input images from the imaging unit 102 (step S112). The processes from step S112 to step S118 may be repeated for each input image (that is, each frame).

In step S114, the self-position detecting unit 120 tracks FPs present in the input image. For example, the self-position detecting unit 120 detects a patch (for example, a small image of 3×3=9 pixels having the center of an FP) of each FP stored in advance in the data storage unit 130 from the input image. Here, the position of the detected patch, that is, the position of the FP, is used later when the state variable is updated.

In step S116, the self-position detecting unit 120 generates a predicted value of the state variable after 1 frame, for example, based on a predetermined prediction model. Also, in step S118, the self-position detecting unit 120 updates the state variable by using the predicted value of the state variable generated in step S116 and an observed value corresponding to the position of the FP detected in step S114. The self-position detecting unit 120 executes the processes of steps S116 and S118 based on a principle of an extended Kalman filter.

As a result of such processing, a value of the state variable updated for each frame is output. Content of processes of tracking of the FP (step S114), prediction of the state variable (step S116), and updating of the state variable (step S118) will be described more specifically.

(1-1) Tracking of Feature Point

In this embodiment, the data storage unit 130 stores in advance feature data representing features of objects corresponding to physical objects (the communication device 20 and other physical objects), which may be present in the real space. For example, the feature data includes small images, that is, patches regarding one or more FPs, each representing a feature of the appearance of each object. For example, the patch may be the small image including 3×3=9 pixels having the center of the FP.

Figure 6:
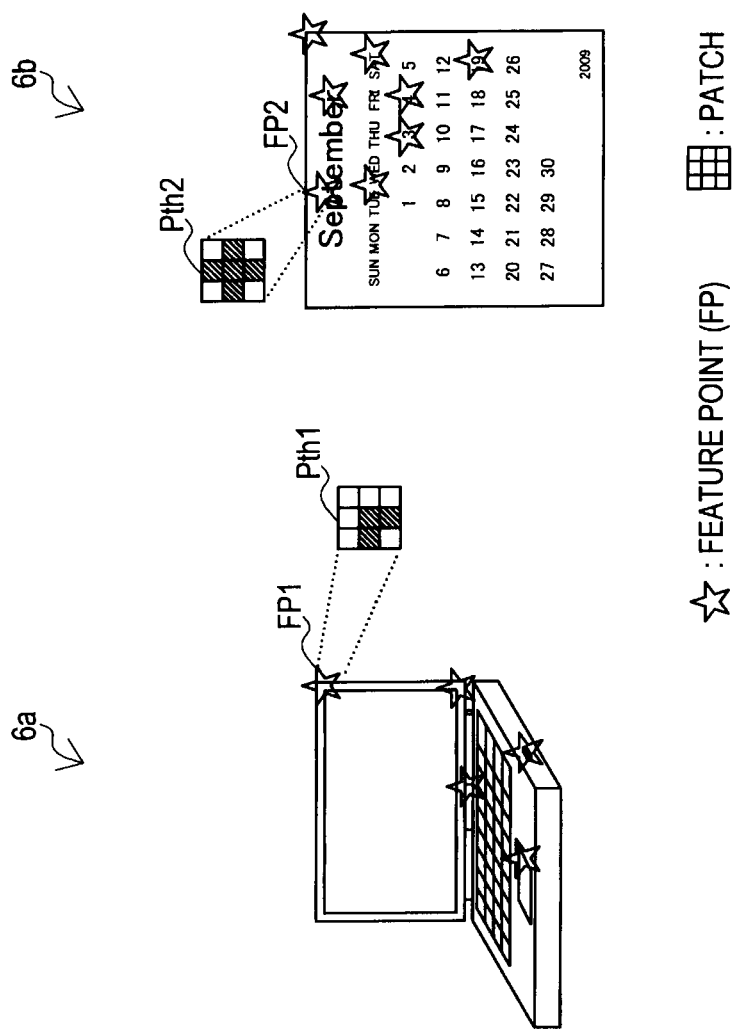
FIG. 6 is an illustrative diagram illustrating a feature point set on an object.
Figure 7:
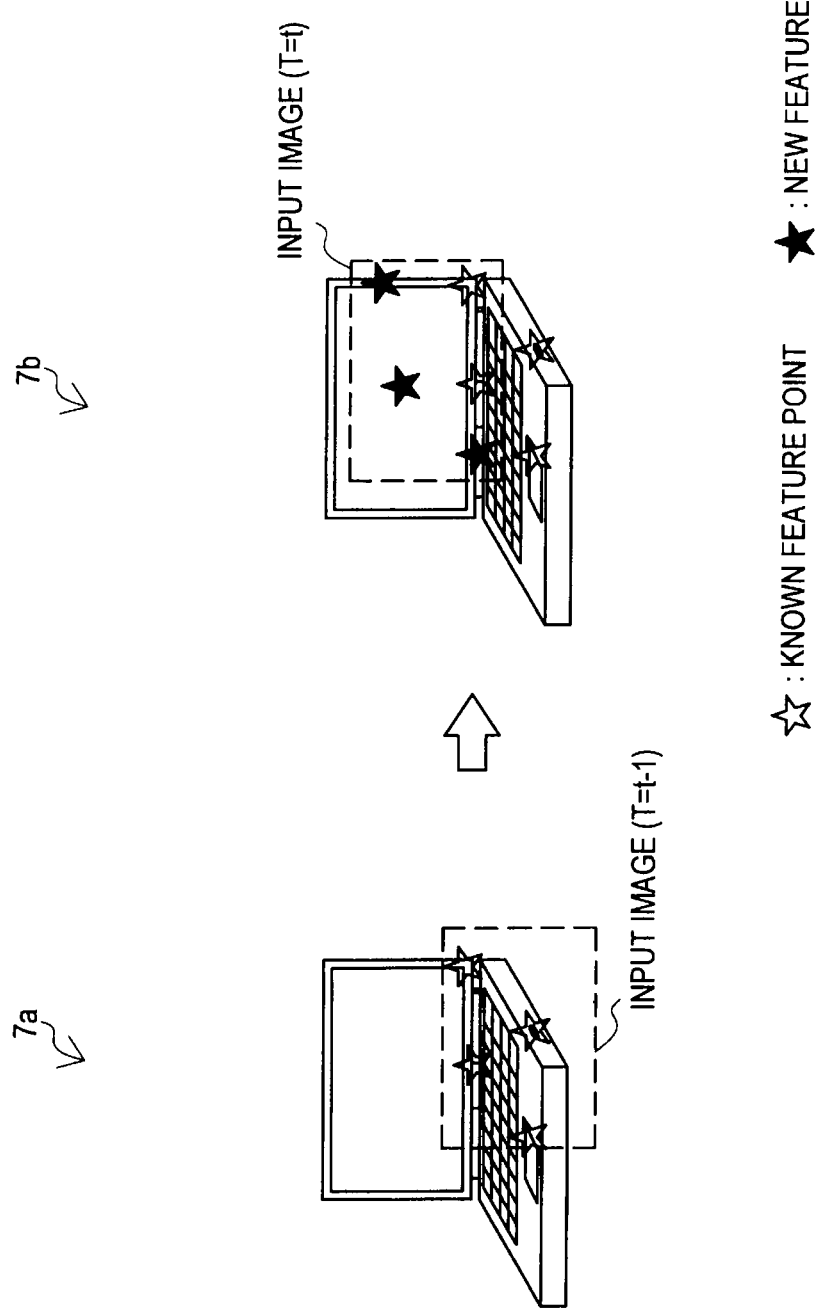
FIG. 7 is an illustrative diagram illustrating the addition of a feature point.

FIG. 6 illustrates two examples of the objects and an example of FPs and patches set on each object. A left object in FIG. 6 is an object representing a PC (see FIG. 6*a*). A plurality of FPs including a feature point FP1 are set on the object. Further, a patch Pth1 is defined in association with the feature point FP1. On the other hand, a right object in FIG. 6 is an object representing a calendar (see FIG. 6*b*). A plurality of FPs including a feature point FP2 are set on the object. Further, a patch Pth2 is defined in association with the feature point FP2.

Upon acquisition of an input image from the imaging unit 102, the self-position detecting unit 120 collates partial images included in the input image and the patch for each FP illustrated in FIG. 6 stored in advance in the data storage unit 130. The self-position detecting unit 120 then specifies a position of each FP included in the input image (for example, a position of a center pixel of the detected patch) as a result of collation.

For tracking FPs (step S114 in FIG. 5), it is not necessary to store in advance data regarding all of the FPs to be tracked in the data storage unit 130. For example, four FPs are detected in the input image at time T=t−1 in an example illustrated in FIG. 7 (see FIG. 7a). Next, if the position or the posture of the camera changes at time T=t, only two of the four FPs shown in the input image at time T=t−1 are shown in the input image. In this case, the self-position detecting unit 120 may newly set FPs in positions having a feature pixel pattern of the input image and may use the new FPs in the self-position detection process for a subsequent frame. For example, in the example of FIG. 7, three new FPs are set on the object at time T=t (see FIG. 7b). This is one feature of the SLAM technology. Thereby, the cost of presetting all FPs can be reduced and the accuracy of processing can be improved using a number of FPs to be tracked.

(1-2) Prediction of State Variable

In this embodiment, the self-position detecting unit 120 uses a state variable X shown in the following Equation as the state variable to which the extended Kalman filter to be is applied.

[Equation 1]

$$X = \begin{pmatrix} x \\ \omega \\ \dot{x} \\ \dot{\omega} \\ p_1 \\ \vdots \\ p_N \end{pmatrix} \quad (1)$$

The first element of the state variable X in Equation (1) represents a three-dimensional position of the camera in a global coordinate system (x, y, z) being a coordinate system set in the real space, as expressed in the following Equation.

[Equation 2]

$$x = \begin{pmatrix} x_c \\ y_c \\ z_c \end{pmatrix} \quad (2)$$

Also, the second element of the state variable is a four-dimensional vector ω having a quaternion as an element corresponding to a rotation matrix representing the posture of the camera. The posture of the camera may be represented using an Euler angle in place of the quaternion. Also, the third and fourth elements of the state variable represent the moving speed and the angular speed of the camera, respectively.

Further, the fifth and subsequent elements of the state variable represent a three-dimensional position $p_i$ of a feature point $FP_i$ (i=1 . . . N) in the global coordinate system as expressed in the following Equation. As described above, the number of the FPs, N, may change during processing.

[Equation 3]

$$p_i = \begin{pmatrix} x_i \\ y_i \\ z_i \end{pmatrix} \quad (3)$$

The self-position detecting unit 120 generates a predicted value of the state variable in a latest frame based on the value of the state variable X initialized in step S102 or the value of the state variable X updated in a previous frame. The predicted value of the state variable is generated according to a state equation of the extended Kalman filter according to multidimensional normal distribution as shown in the following Equation.

[Equation 4]

$$\text{predicted state variable } \hat{X} = F(X, a) + w \quad (4)$$

Here, F represents a prediction model regarding the state transition of a system and a represents a prediction condition. Also, w represents Gaussian noise, and, for example, may include a model approximation error, an observation error, and the like. In general, an average of the Gaussian noise w is 0.

Figure 8:
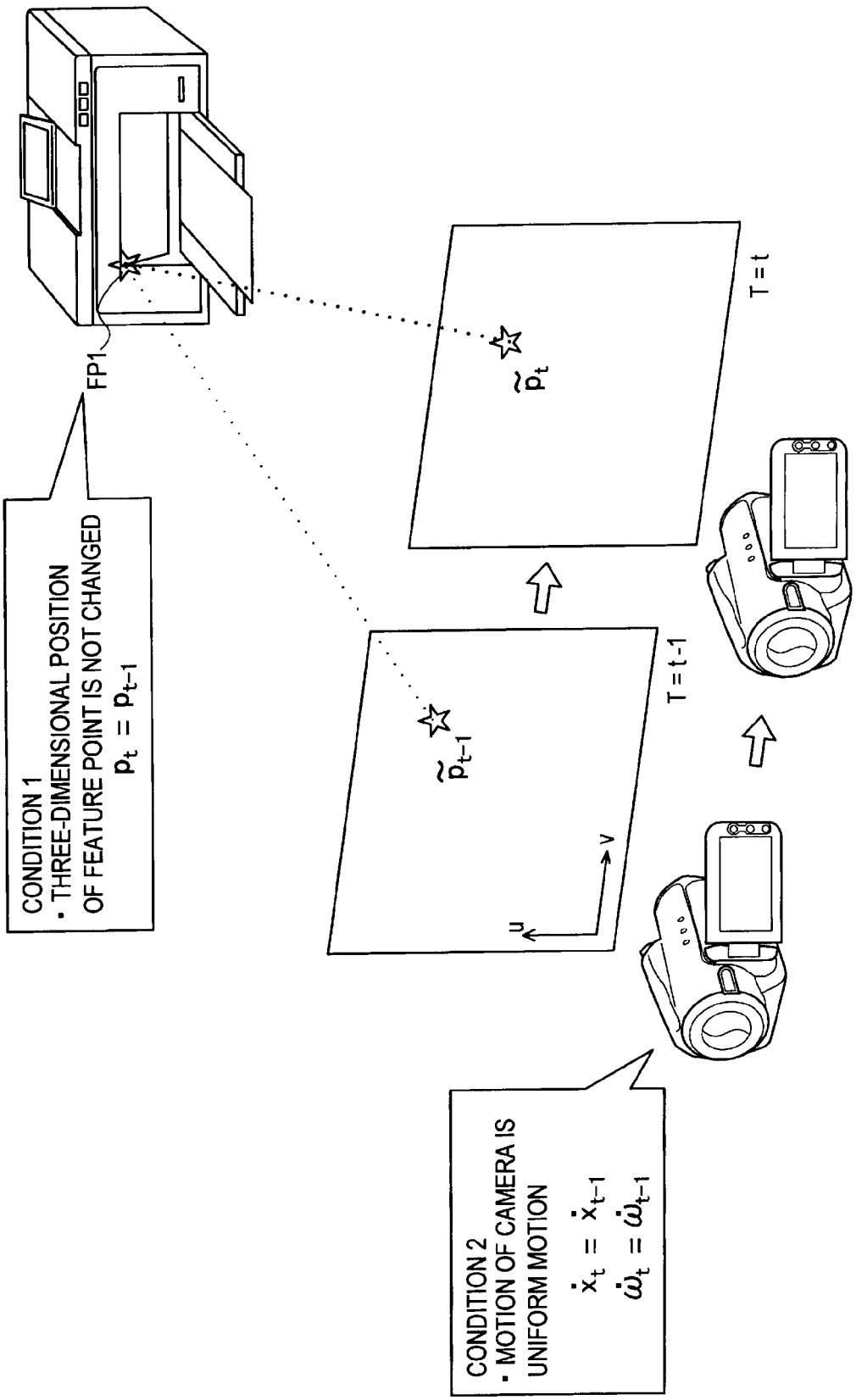
FIG. 8 is an illustrative diagram illustrating an example of a prediction model.

FIG. 8 is an illustrative diagram illustrating an example of the prediction model according to this embodiment. Referring to FIG. 8, two prediction conditions in the prediction model according to this embodiment are shown. First, as a first condition, it is assumed that the three-dimensional position of the FP in the global coordinate system does not change. That is, if the three-dimensional position of the feature point FP1 at time T is $p_T$, the following relationship is established.

[Equation 5]

$$p_t = p_{t-1} \quad (5)$$

Next, as a second condition, it is assumed that the motion of the camera is uniform motion. That is, the following relationship is established for the speed and the angular speed of the camera from time T=t−1 to time T=t.

[Equations 6]

$$\dot{x}_t = \dot{x}_{t-1} \quad (6)$$

$$\dot{\omega}_t = \dot{\omega}_{t-1} \quad (7)$$

The self-position detecting unit 120 generates a predicted value of the state variable for the latest frame based on the prediction model and the state equation expressed in Equation (4).

(1-3) Updating of State Variable

For example, the self-position detecting unit 120 evaluates an error between observation information predicted from the predicted value of the state variable and actual observation information obtained as a result of FP tracking, using an observation equation. In Equation (8), v is the error.

[Equations 7]

$$\text{observation information } s = H(\hat{X}) + v \quad (8)$$

$$\text{predicted observation information } \hat{s} = H(\hat{X}) \quad (9)$$

Here, H represents an observation model. For example, a position of the feature point $FP_i$ on the imaging plane (u-v plane) is defined as expressed in the following Equation.

[Equation 8]

$$\text{position of } FP_i \text{ on imaging plane } \tilde{p}_i = \begin{pmatrix} u_i \\ v_i \\ 1 \end{pmatrix} \quad (10)$$

Here, all of the position x of the camera, the posture co of the camera, and the three-dimensional position $p_i$ of the feature point $FP_i$ are given as the elements of the state variable X. Then, the position of the feature point $FP_i$ on the imaging plane is derived using the following Equation according to a pinhole model.

[Equation 9]

$$\lambda \tilde{p}_i = A R_\omega (p_i - x) \quad (11)$$

Here, λ represents a parameter for normalization, A represents a camera internal parameter, and $R_\omega$ represents the rotation matrix corresponding to the quaternion ω representing the posture of the camera included in the state variable X. The camera internal parameter A is given in advance as expressed in the following Equation according to characteristics of the imaging device, which takes the input image.

[Equation 10]

$$A = \begin{pmatrix} -f \cdot k_u & f \cdot k_u \cdot \cot\theta & u_O \\ 0 & -\dfrac{f \cdot k_v}{\sin\theta} & v_O \\ 0 & 0 & 1 \end{pmatrix} \quad (12)$$

Here, f represents a focal distance, θ represents orthogonality of an image axis (ideal value is 90 degrees), $k_u$ represents a scale of a vertical axis of the imaging plane (a scale change rate from the global coordinate system to the coordinate system of the imaging plane), $k_v$ represents a scale of a horizontal axis of the imaging plane, and $(u_o, v_o)$ represents a center position of the imaging plane.

Therefore, a feasible latest state variable X may be obtained by searching for the state variable $X_s$ which minimizes the error between the predicted observation information derived using Equation (11), that is, the position of each FP on the imaging plane and the result of FP tracking in step S114 of FIG. 5.

[Equation 11]

$$\text{latest state variable } X \leftarrow \hat{X} + \text{Innov}(s - \hat{s}) \quad (13)$$

The self-position detecting unit 120 outputs the position x and the posture ω of the camera (imaging device) dynamically updated by applying the SLAM technology to the environment map building unit 150, the communication processing unit 180, and the display control unit 190.

(2) Data Storage Unit

Figure 9:
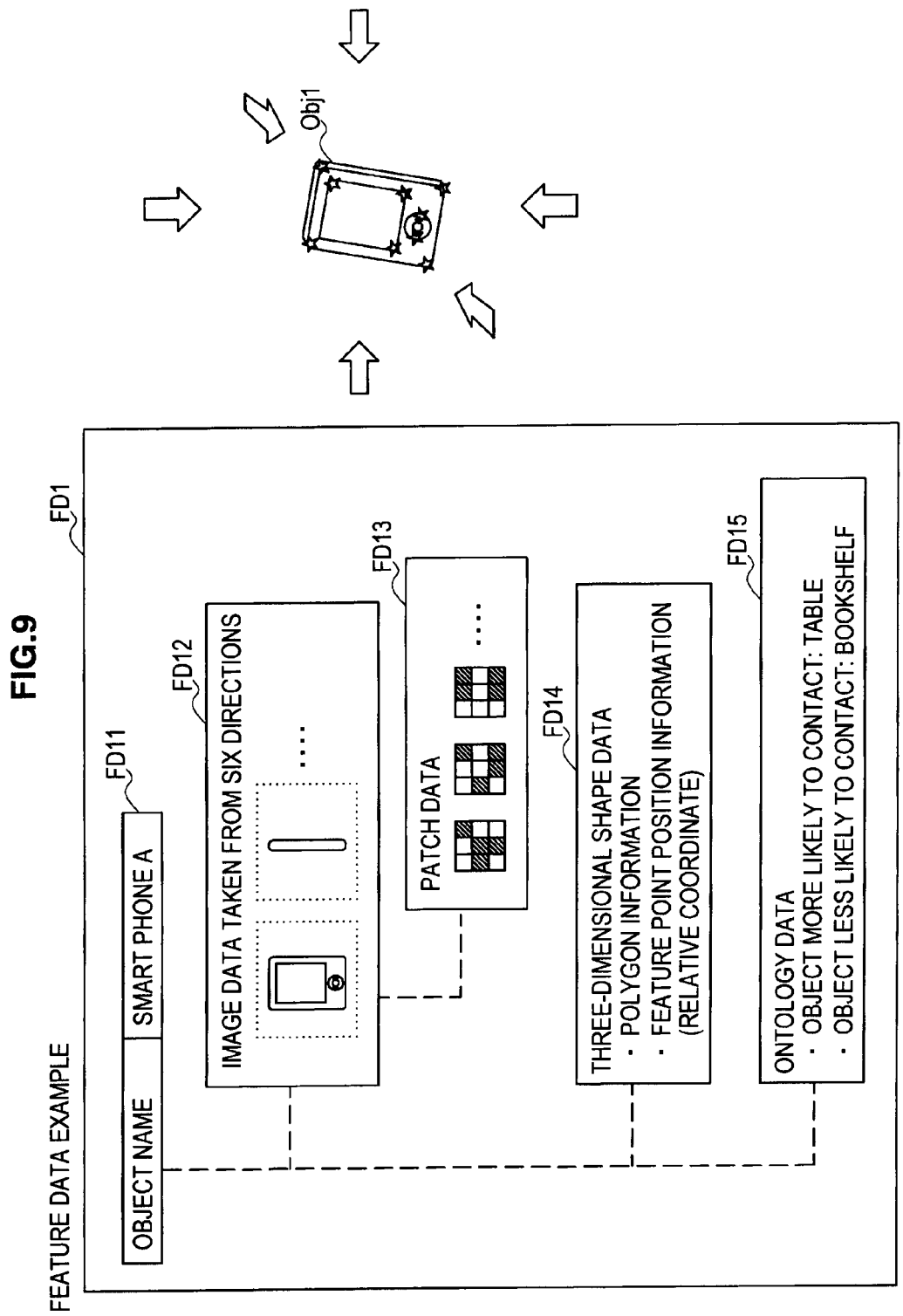
FIG. 9 is an illustrative diagram illustrating an example of a configuration of feature data.

The data storage unit 130 stores in advance feature data representing features of an object corresponding to a physical object, which may be present in the real space, by using a storage medium such as a hard disk or a semiconductor memory. An example in which the data storage unit 130 is part of the environment map generating unit 110 is illustrated in FIG. 4, but the present invention is not limited to such an example, and the data storage unit 130 may be provided outside the environment map generating unit 110. FIG. 9 is an illustrative diagram illustrating an example of the configuration of the feature data.

Referring to FIG. 9, feature data FD1 is shown as an example in an object Obj1. The feature data FD1 includes an object name FD11, image data FD12 taken from six directions, patch data FD13, three-dimensional shape data FD14, and ontology data FD15.

The object name FD11 is a name by which a corresponding object can be specified such as "Smart Phone A."

For example, the image data FD12 includes six image data obtained by taking images of the corresponding object from six directions (front, back, left, right, above, and below). The patch data FD13 is a set of small images having the center of each FP for each of one or more FPs set on each object. The image data FD12 and the patch data FD13 may be used for an object recognition process by the image recognizing unit 140 to be described later. Also, the patch data FD13 may be used for the above-described self-position detection process by the self-position detecting unit 120.

The three-dimensional shape data FD14 includes polygon information for recognizing a shape of the corresponding object and three-dimensional position information of FPs. The three-dimensional shape data FD14 may be used for an environment map building process by the environment map building unit 150 to be described later.

For example, the ontology data FD15 is the data, which may be used to assist in the environment map building process by the environment map building unit 150. In the example of FIG. 9, the ontology data FD15 indicates that the object Obj1, which is the smart phone, is more likely to come in contact with an object corresponding to a table and is less likely to come in contact with an object corresponding to a bookshelf.

(3) Image Recognizing Unit

The image recognizing unit 140 specifies which object corresponds to each of physical objects shown in the input image by using the above-described feature data stored in the data storage unit 130.

Figure 10:
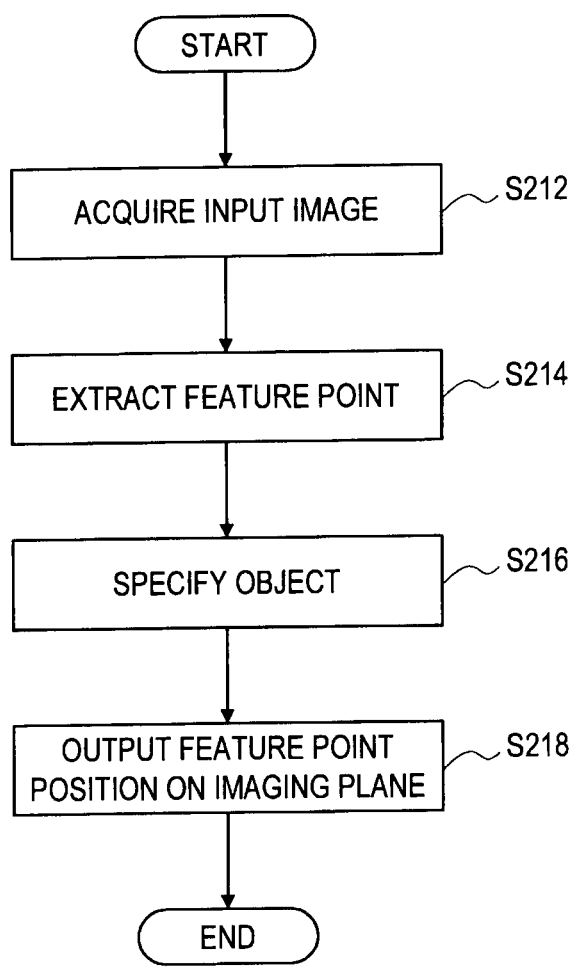
FIG. 10 is a flowchart showing an example of a flow of an object recognition process according to an embodiment.

FIG. 10 is a flowchart illustrating an example of a flow of the object recognition process by the image recognizing unit 140. Referring to FIG. 10, the image recognizing unit 140 first obtains an input image from the imaging unit 102 (step S212). Next, the image recognizing unit 140 collates partial images included in the input image and patches of one or more FPs of each object included in feature data, and extracts FPs included in the input image (step S214). The FPs used in the object recognition process by the image recognizing unit 140 may not necessarily be the same as the FPs used in the self-position detection process by the self-position detecting unit 120. However, if common FPs are used in both the processes, the image recognizing unit 140 may reuse a tracking result of FPs by the self-position detecting unit 120.

Next, the image recognizing unit 140 specifies the object shown in the input image based on an extraction result of FPs (step S216). For example, if the FPs belonging to one object are extracted with high density in a certain area, the image recognizing unit 140 may recognize that the object is shown in the area. The image recognizing unit 140 then outputs an object name (or an identifier) of the specified object and positions of the FPs belonging to the object on the imaging plane to the environment map building unit 150 (step S218).

(4) Environment Map Building Unit

The environment map building unit 150 generates an environment map by using the position and the posture of the camera input from the self-position detecting unit 120, the positions of the FPs on the imaging plane input from the image recognizing unit 140 and the feature data stored in the data storage unit 130. In this specification, the environment map is a set of data representing positions (and postures) of one or more physical objects present in the real space. Specifically, in this embodiment, the environment map includes data representing positions and postures of two or more communication devices 20 as physical objects present in the real space. Also, for example, the environment map may include object names corresponding to physical objects, three-dimensional positions of FPs belonging to the physical objects, polygon information configuring shapes of the physical objects, and the like. For example, the environment map may be built by obtaining the three-dimensional position of each FP according to the above-described pinhole model from the positions of the FPs on the imaging plane input from the image recognizing unit 140.

If the relation equation of the pinhole model expressed in Equation (11) is modified, the three-dimensional position $p_i$ of the feature point $FP_i$ in the global coordinate system may be obtained by the following Equation.

[Equation 12]

$$p_i = x + \lambda \cdot R_\omega^T \cdot A^{-1} \cdot \tilde{p}_i = x + d \cdot R_\omega^T \frac{A^{-1} \cdot \tilde{p}_i}{\|A^{-1} \cdot \tilde{p}_i\|} \quad (14)$$

Here, d represents a distance between the camera and each FP in the global coordinate system. The environment map building unit 150 may calculate the distance d based on the positions of at least four FPs on the imaging plane and the distance between the FPs for each object. The distance between the FPs is stored in advance in the data storage unit 130 as the three-dimensional shape data FD14 included in the feature data described with reference to FIG. 9. A process of calculating the distance d in Equation (14) is disclosed in detail in the above-described Japanese Patent Laid-Open Publication No. 2008-304268.

If the distance d is calculated, the remaining variables of a right side of Equation (14) are the position and the posture of the camera input from the self-position detecting unit 120 and the position of the FP on the imaging plane input from the image recognizing unit 140, and all of which are known. The environment map building unit 150 then calculates the three-dimensional position in the global coordinate system for each FP input from the image recognizing unit 140 according to Equation (14). The environment map building unit 150 then builds a latest environment map according to the calculated three-dimensional position of each FP and causes the environment map storage unit 152 to store the built environment map. At this time, the environment map building unit 150 may improve the accuracy of data of the environment map by using the ontology data FD15 included in the feature data described with reference to FIG. 9.

The environment map storage unit 152 stores the environment map built by the environment map building unit 150 by using the storage medium such as the hard disk or the semiconductor memory. In this embodiment, in the environment map storage unit 152, data related to each communication device 20 is associated with identification information of each communication device 20 registered in advance (for example, an IP address, a host name, a MAC address, or the like).

[3-3. Communication Processing Unit]

The communication processing unit 180 controls data transmission from one communication device 20 to another device according to a user input received from the communication device 20 by using an environment map generated by the environment map generating unit 110. In this embodiment as shown in FIG. 4, the communication processing unit 180 includes a communication I/F 182, a detecting unit 184, a selecting unit 186, and a communication control unit 188.

(1) Communication I/F

The communication I/F 182 intermediates communication with the communication device 20 by the communication control device 100. For example, the communication I/F 182 may be the same wireless or wired communication interface as the communication I/F 46 of the communication device 20. The communication I/F 182 outputs a signal received from the communication device 20 to the detecting unit 184 and the communication control unit 188. Also, the communication I/F 182 transmits a signal input from the communication control unit 188 to the communication device 20.

(2) Detecting Unit

The detecting unit 184 detects a user input by a user toward the communication device 20, which designates any data provided in the communication device 20 and a direction, by monitoring the signal received by the communication I/F 182. For example, the user input, which designates any data provided in the communication device 20 and the direction, is converted into a user input signal IN in the communication device 20, and is transmitted from the communication device 20 to the communication control device 100. When detecting that the user input signal IN is received by the communication I/F 182, the detecting unit 184 notifies the selecting unit 186 of content of the user input, and causes the selecting unit 186 to select a device to be designated as a transmission destination of data from the communication device 20 of a transmission source of the user input signal IN.

Figure 11:
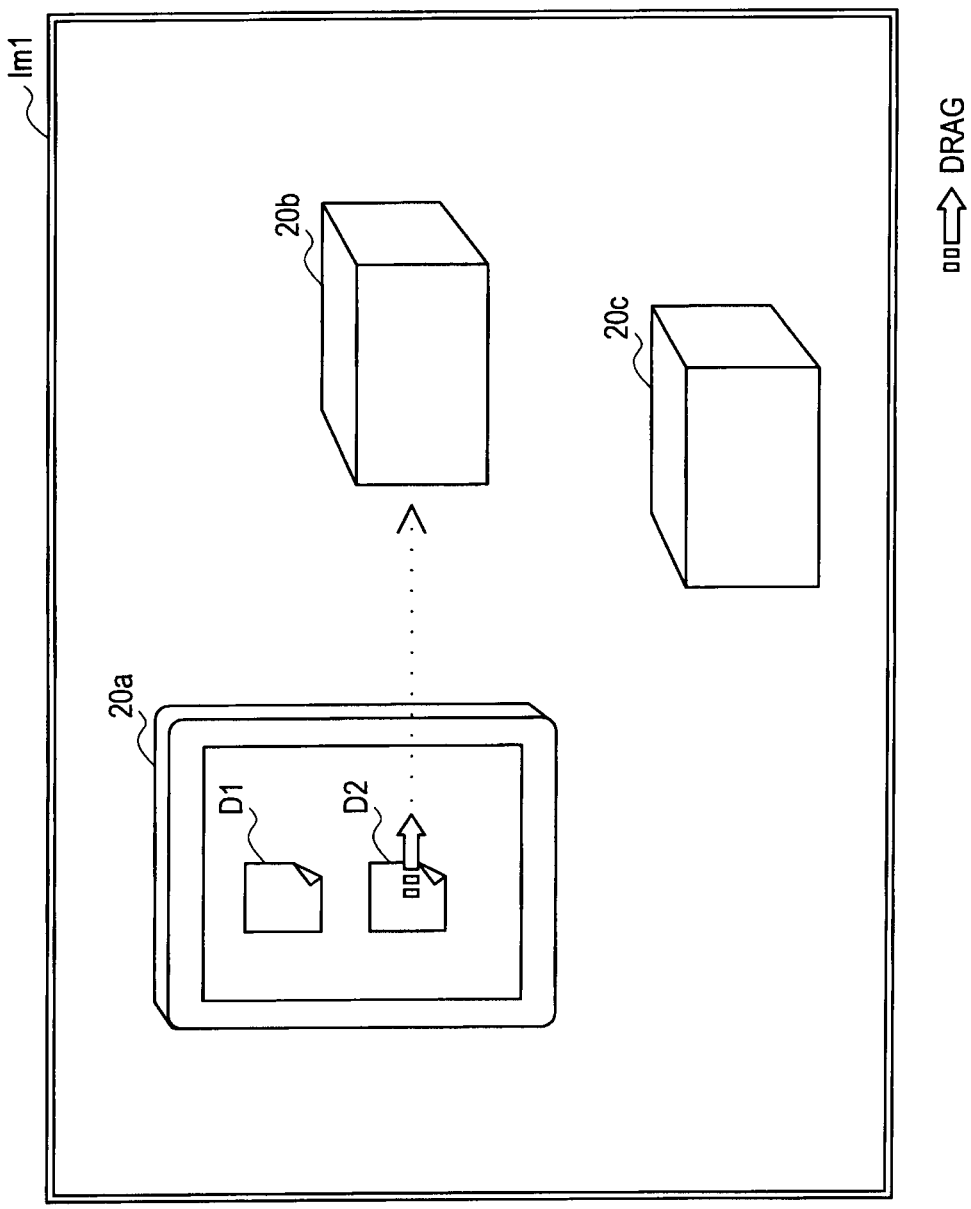
FIG. 11 is an illustrative diagram illustrating a user input to the communication device according to an embodiment.

FIG. 11 is an illustrative diagram illustrating a user input to the communication device 20 to be detected by the detecting unit 184. Referring to FIG. 11, an input image Im1 is shown as an example to be imaged by the camera of the communication control device 100. The communication devices 20a, 20b, and 20c are shown in the input image Im1. Two icons respectively representing data D1 and D2 are displayed on the screen of the communication device 20a.

In a situation as shown in FIG. 11, for example, the user who desires to transmit the data D2 to the communication device 20b drags the icon representing the data D2 in a direction (a right direction of the figure) in which the communication device 20b is present. The communication device 20a then senses the drag event and recognizes the icon designated by the user input and the drag direction. The communication device 20a transmits a user input signal IN having content of information (for example, a data file path) for specifying the data D2 corresponding to the designated icon and the drag direction to the communication control device 100. The detecting unit 184 of the communication control device 100 monitors the signal received by the communication I/F 182, and detects the user input signal IN.

For example, the detecting unit 184 may detect the user input to the communication device 20 by monitoring a set of input images input from the imaging unit 102, and recognizing an image of an operation of the user shown in the input images, instead of detecting the user input signal IN transmitted from the communication device 20.

(3) Selecting Unit

The selecting unit 186 selects a communication device, which is a transmission destination of the designated data from an environment map generated by the environment map generating unit 110, on the basis of the direction designated by the user input. In this embodiment, for example, the selecting unit 186 selects a communication device located in the direction designated by the user input with respect to the communication device 20 of the transmission source of the user input signal IN in the environment map as a device of the data transmission destination. For example, if there are a plurality of communication devices located in the direction, the selecting unit 186 can select a device located closest to the communication device 20 of the transmission source among the plurality of devices as the data transmission destination device.

Figure 12:
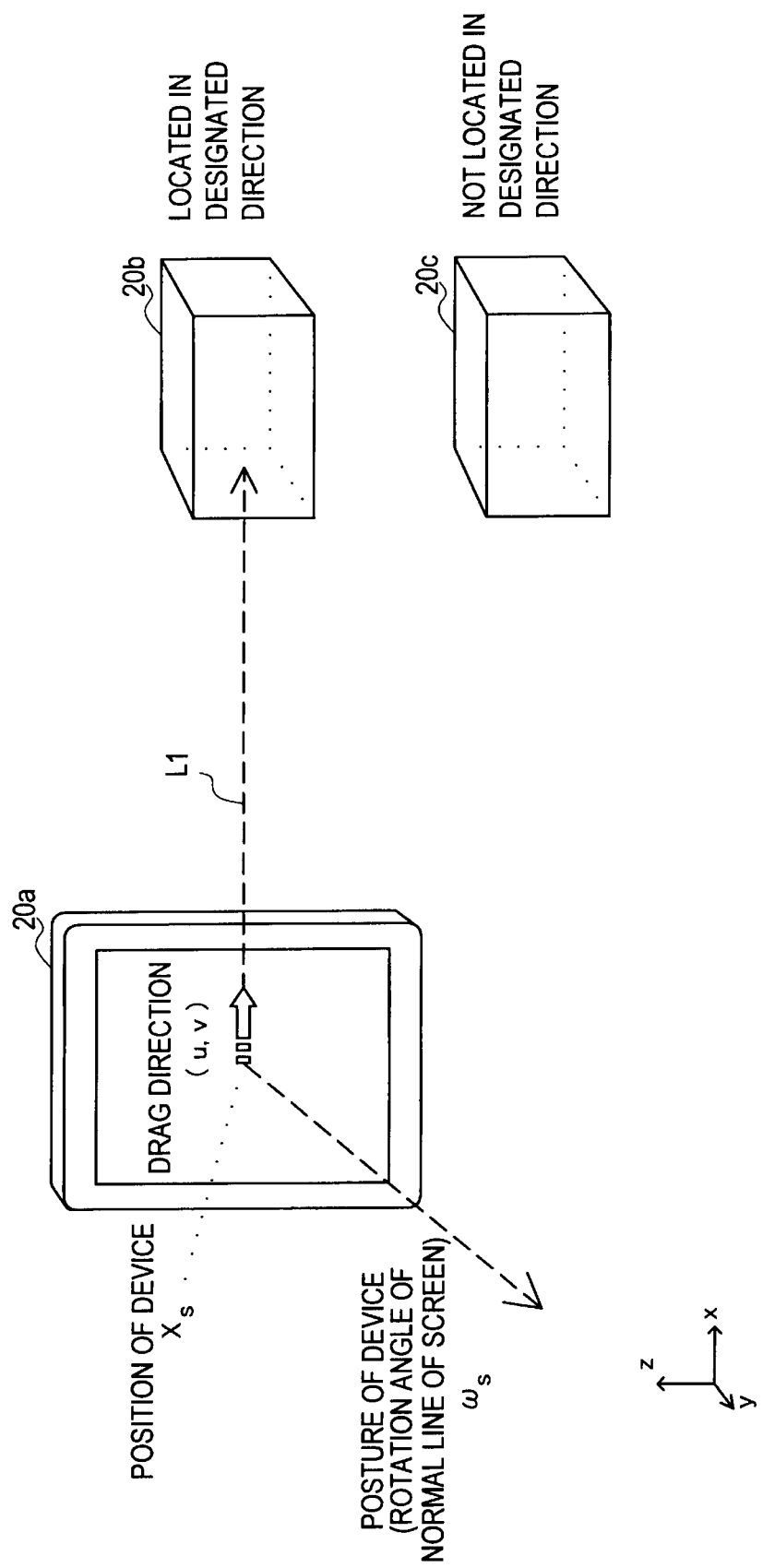
FIG. 12 is a first illustrative diagram illustrating the selection of a transmission destination according to an embodiment.
Figure 13:
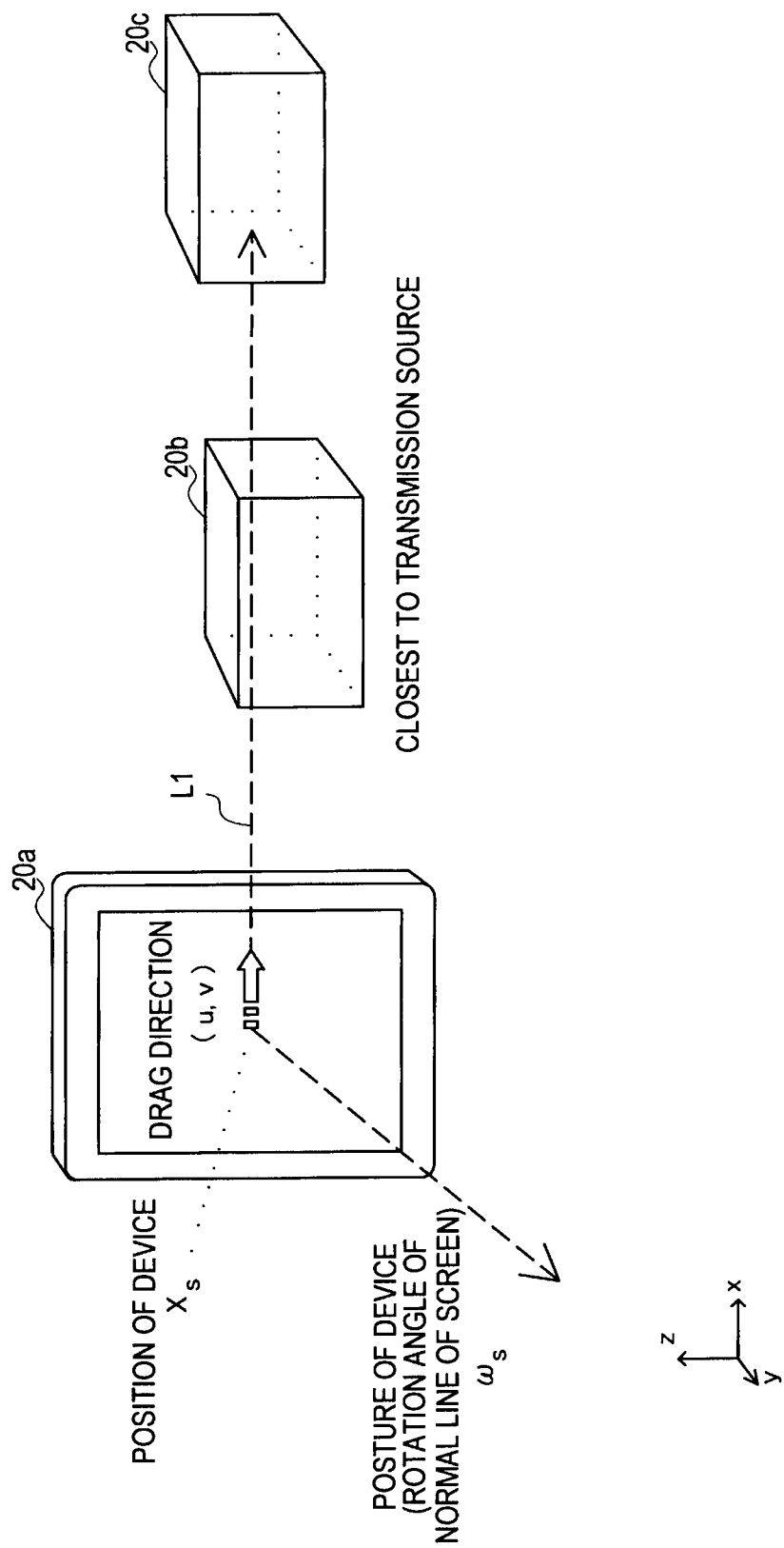
FIG. 13 is a second illustrative diagram illustrating the selection of a transmission destination according to an embodiment.

FIGS. 12 and 13 are illustrative diagrams illustrating the selection of the transmission destination by the selecting unit 186 according to this embodiment.

Referring to FIG. 12, the communication devices 20a, 20b, and 20c included in the environment map are shown. A position of the communication device 20a is retained in the environment map as a three-dimensional position $X_s$ in the global coordinate system (x, y, z). A posture of the communication device 20a is retained in the environment map as a quaternion $\omega_s$ corresponding to a rotation matrix in the global coordinate system (x, y, z) of the environment map. The posture $\omega_s$ of the communication device 20a corresponds to a rotation angle of a normal line of the screen of the communication device 20a. If a drag direction (u, v) on the screen of the communication device 20a included in the user input signal IN is defined in addition to the position $X_s$ and the posture $\omega_s$ of the communication device 20a, the position $X_s$ is designated as a start point and the user can uniquely specify a straight line L1 along the direction designated by the drag in the global coordinate system of the environment map.

The selecting unit 186 specifies the straight line L1 as described above, and selects a communication device 20 located on the straight line L1 or located at least near the straight line L1 as the data transmission destination device. In the example of FIG. 12, the communication device 20b is located on the straight line L1 having the position $X_s$ of the communication device 20a as the start point. On the other hand, the communication device 20c is located away from the straight line L1. Here, the selecting unit 186 selects the communication device 20b as the device of the transmission destination of data from the communication device 20a.

Referring to FIG. 13, the communication devices 20a, 20b, and 20c included in the environment map are shown. These devices have a positional relationship different from the example of FIG. 12. Even in this case, the selecting unit 186 specifies the straight line L1 having the start point at the communication device 20a on the basis of the position $X_s$ and the posture $\omega_s$ of the communication device 20a in the environment map and the drag direction (u, v) designated by the user input. In the example of FIG. 13, the communication devices 20b and 20c are all located on the straight line L1. At this time, for example, the selecting unit 186 can select the communication device 20b, located closer to the communication device 20a, as a device of a transmission destination of data from the communication device 20a, from the communication devices 20b and 20c. Alternatively, for example, the selecting unit 186 can display a message for designating any device (the communication device 20b or 20c) to the user, and can select any device as the data transmission destination device according to a result of a designation by the user.

Figure 14:
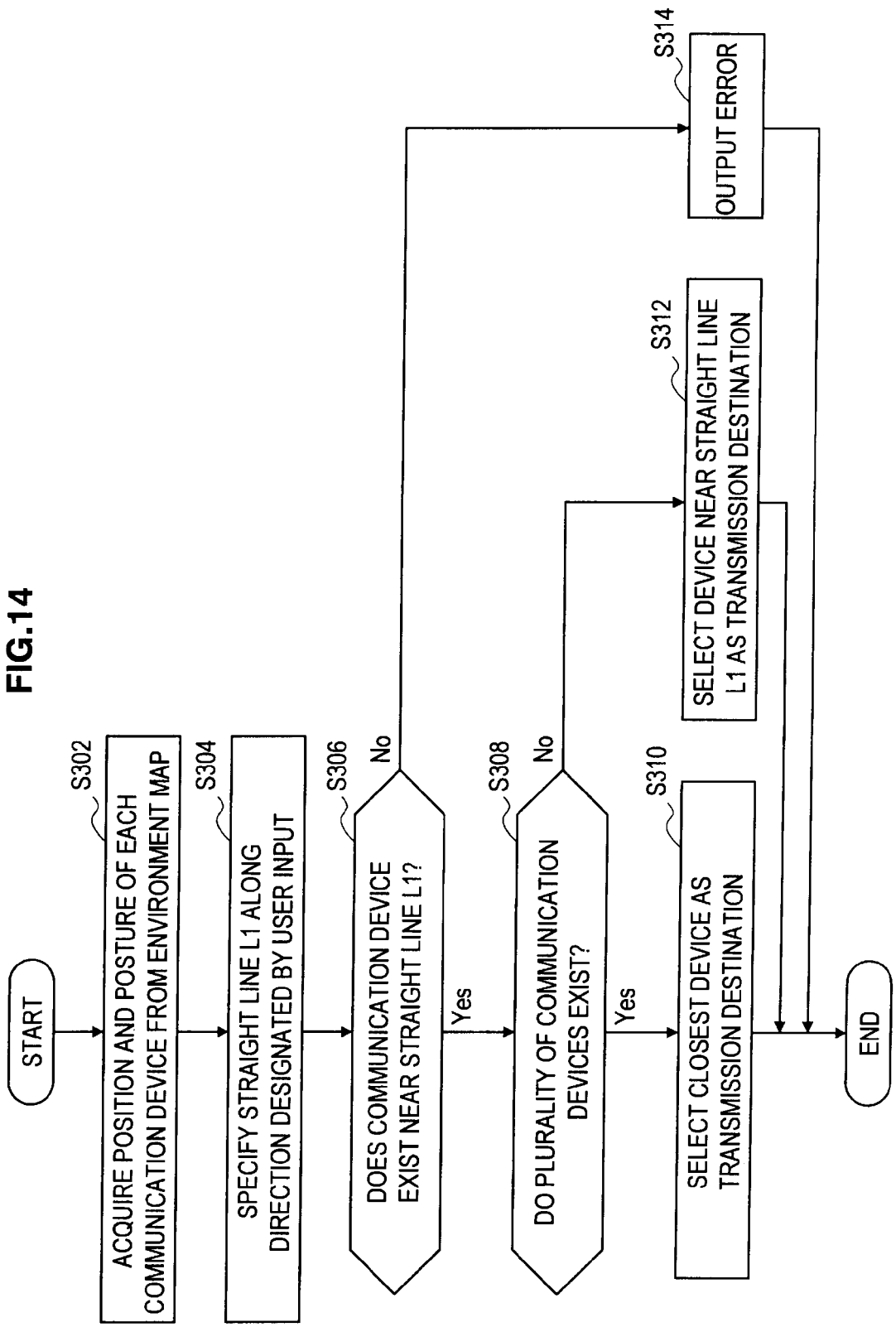
FIG. 14 is a flowchart showing an example of a transmission destination selection process according to an embodiment.

FIG. 14 is a flowchart showing an example of a flow of a transmission destination selection process by the selecting unit 186 according to this embodiment.

Referring to FIG. 14, the selecting unit 186 first acquires a position and a posture of each communication device from an environment map (step S302). Next, the selecting unit 186 designates a position of a communication device 20 of a transmission source as a start point, and specifies a straight line L1 along a direction designated by a user input (step S304).

Next, the selecting unit 186 determines whether or not another communication is at least near the specified straight line L1 (that is, on the straight line L1 or near the straight line L1) (step S306). For example, it can be determined that a device having a distance from the straight line L1, which is less than a preset threshold value, is located near the straight line L1. Here, if no other communication device is located near the straight line L1, the selecting unit 186 outputs an error to the communication control unit 188 (step S314) and terminates the process. On the other hand, if another communication device is present at least near the straight line L1, the process proceeds to step S308.

Next, the selecting unit 186 determines whether or not a plurality of other communication devices are present at least near the straight line L1 (step S308). Here, if the plurality of other communication devices are present at least near the straight line L1, the selecting unit 186 selects a communication device located nearest the communication device 20 of the transmission source as a data transmission destination device (step S310). On the other hand, if only one other communication device is located at least near the straight line L1, the selecting unit 186 selects the other communication device as the data transmission destination device (step S312).

The selecting unit 186 outputs identification information for identifying the data transmission destination device selected by the above-described transmission destination selection process to the communication control unit 188. The data transmission destination device selected by the selecting unit 186 may not necessarily have the equivalent configuration of the communication device 20 according to this embodiment. For example, if a general communication device, which does not have a function of transmitting the user input signal IN to the communication control device 100, can be recognized in the environment map generated by the environment map generating unit 110, the general communication device can be selected as the data transmission destination device by the selecting unit 186.

(4) Communication Control Unit

If a user input is detected by the detecting unit 184, the communication control unit 188 transmits data designated by the user input from a communication device 20 serving as a target of the user input to another communication device. More specifically, for example, if a user input signal IN is received from one communication device 20, the communication control unit 188 transmits an instruction signal SIG through which a data transmission instruction is given to the one communication device 20 via the communication I/F 182. The instruction signal SIG is a signal for instructing to transmit the data designated by the user input to another communication device selected by the selecting unit 186 according to the above-described transmission destination selection process. As a result, the data designated by the user input is transmitted from the one communication device 20 to another communication device located in a direction designated by the user input.

The communication control unit 188 transmits the instruction signal SIG and also outputs identification information for identifying the data transmission source device and the data transmission destination device to the display control unit 190.

[3-4. Display Control Unit]

The display control unit 190 displays an animation indicating data transmission on a screen of a display device when data is transmitted from a data transmission source device to a data transmission destination device. For example, the display control unit 190 generates an output image by superimposing the animation indicating the data transmission on an input image input from the imaging unit 102. The display control unit 190 displays the generated output image on the HMD 104. For example, the animation indicating the data transmission may be an animation in which any virtual object (a figure, a symbol, or a character) moves from the data transmission source device to the data transmission destination device.

More specifically, for example, the display control unit 190 calculates a position where the animation is superimposed on the input image according to Equation (11) of the pinhole model by using a position and a posture of the camera acquired from the environment map generating unit 110. For example, a display position of a start point of the animation is calculated by substituting a three-dimensional position of the data transmission source device into the three-dimensional position $p_i$ of the feature point $FP_i$ of the right side in Equation (11). Also, a display position of an end point of the animation is calculated by substituting a three-dimensional position of the data transmission destination device into the three-dimensional position $p_i$ of the feature point $FP_i$ of the right side in Equation (11). The display control unit 190 superimposes the animation in which the object moves between the display position of the start point and the display position of the end point over a set of input images.

Figure 15:
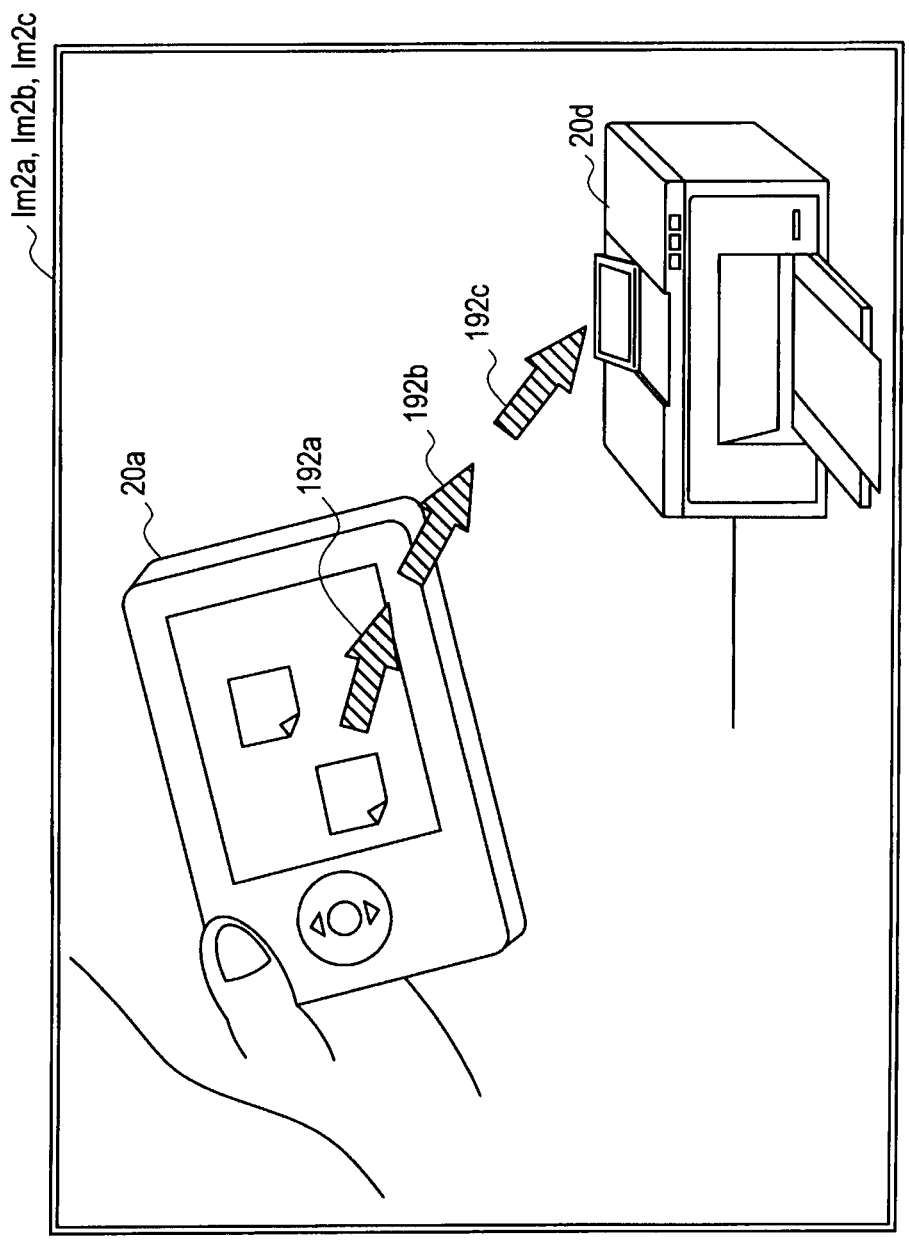
FIG. 15 is an illustrative diagram showing an example of an animation related to data transmission according to an embodiment.

FIG. 15 is an illustrative diagram showing an example of an animation related to data transmission according to this embodiment. Referring to FIG. 15, output images Im2a to Im2c on which a set of animations 192a to 193a is superimposed are shown in one illustrative diagram for convenience. Actually, the animation 192a may be superimposed on the output image Im2a, the animation 192b on the output image Im2b, and the animation 192c on the output image Im2c in order along a time axis. The animations shown in FIG. 15 have shapes of arrows. As described above, the animations 192a to 192c are sequentially displayed, so that the user can know that data is transmitted from the communication device 20a to the communication device 20d. The data transmission destination device may not necessarily be shown in the input image or the output image as long as its position is recognized in the environment map. That is, data may be transmitted to a device located outside a range of the screen among communication devices located in the direction designated by the user input.

[3.5. Flow of Communication Control Process]

Figure 16:
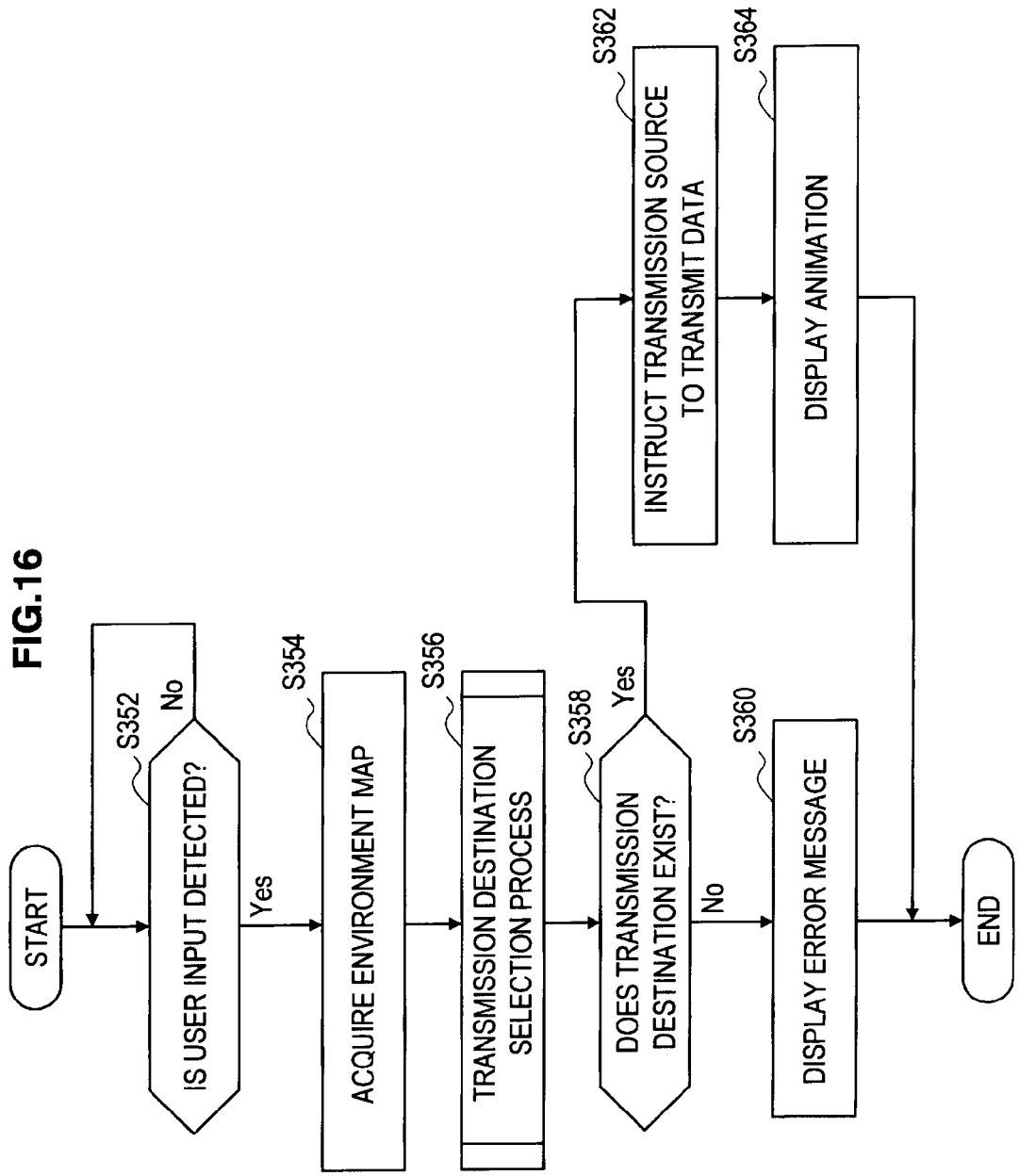
FIG. 16 is a flowchart showing an example of a flow of a communication control process according to an embodiment.

FIG. 16 is a flowchart showing an example of a flow of the communication control process by the communication control device 100 according to this embodiment.

Referring to FIG. 16, first, the detecting unit 184 monitors the presence/absence of a predetermined user input to the communication device 20 (step S352). For example, if the detecting unit 184 detects a user input (a drag or the like) designating any data icon and a direction for the communication device 20, the process proceeds to step S354.

Next, the selecting unit 186 acquires an environment map generated by the environment map generating unit 110 (step S354). Here, the acquired environment map includes an object corresponding to the communication device 20 serving as a target of the user input detected by the detecting unit 184 and an object corresponding to another communication device.

Next, the transmission destination selection process described with reference to FIG. 14 is performed by the selecting unit 186 (step S356). Thereby, a device of a transmission destination of data from the communication device 20 serving as the target of the user input is selected.

Next, the communication control unit 188 determines the presence/absence of the data transmission destination device in a selection result (step S358). For example, if no communication device is present in the direction designated by the user input, an error is output from the selecting unit 186 to the communication control unit 188. In this case, the communication control unit 188 instructs the display control unit 190 to display an error message on the screen (step S360).

On the other hand, if the data transmission destination device is present in the selection result by the selecting unit 186, the communication control unit 188 transmits an instruction signal SIG to the communication device serving as the target of the user input, and transmits data to the data transmission destination device selected by the selecting unit 186 (step S362). During the data transmission, the display control unit 190 displays an animation indicating the data transmission on the screen of the HMD 104 (step S364).

<4. Modified Examples>

In the above-described embodiment, the selecting unit 186 of the communication control device 100 selects a device serving as a data transmission destination from the environment map on the basis of the direction designated by the user input of the drag or the like. Thereby, the user can intuitively designate the transmission destination upon data transmission between the communication devices. On the other hand, the intuitive designation of the transmission destination can be performed according to other methods. In this section, other methods, which make it possible to perform the intuitive designation of the transmission destination, will be described as modified examples of the above-described embodiment.

FIG. 17 is an illustrative diagram illustrating the selection of the transmission destination by the selecting unit 186 according to a modified example.

Referring to FIG. 17, the communication devices 20a, 20b, and 20c included in the environment map are shown. Two icons respectively representing data D1 and D2 are displayed on the screen of the communication device 20a. In a situation as shown in FIG. 17, for example, the user who desires to transmit the data D2 to the communication device 20b holds the communication device 20a above the communication device 20b in reality, and clicks or taps the icon representing the data D2. Then, the communication device 20a senses the user input and transmits a user input signal IN to the communication control device 100. The detecting unit 184 of the communication control device 100 detects the user input signal IN.

At this time, a position of the communication device 20a is retained in the environment map as a three-dimensional position $X_s$ in the global coordinate system (x, y, z) of the environment map. Here, the selecting unit 186 designates the position $X_s$ of the communication device 20a as a start point, and specifies a straight line L2 extending downward along a vertical line in the global coordinate system of the environment map. The selecting unit 186 selects a communication device 20 located on the straight line L2 or located at least near the straight line L2 as the data transmission destination device. In the example of FIG. 17, the communication device 20b is located on the straight line L2. On the other hand, the communication device 20c is located away from the straight line L2. Here, the selecting unit 186 selects the communication device 20b as the device of the transmission destination of data from the communication device 20a.

FIG. 18 is a flowchart showing an example of a flow of the transmission destination selection process by the selecting unit 186 according to a modified example.

Referring to FIG. 18, the selecting unit 186 first acquires a position of each communication device from the environment map (step S402). Next, the selecting unit 186 designates a position of a communication device 20 of a transmission source as a start point, and specifies a straight line L2 extending downward along a vertical line (step S404).

Next, the selecting unit 186 determines whether or not another communication device is present at least near the straight line L2 (that is, on the straight line L2 or near the straight line L2) (step S406). For example, it can be determined that a device having a distance from the straight line L2, which is less than a preset threshold value, is located near the straight line L2. Here, if no other communication device is located near the straight line L2, the selecting unit 186 outputs an error to the communication control unit 188 (step S414) and terminates the process. On the other hand, if another communication device is present at least near the straight line L2, the process proceeds to step S408.

Next, the selecting unit 186 determines whether or not a plurality of other communication devices are present at least near the straight line L2 (step S408). Here, if the plurality of other communication devices are present at least near the straight line L2, the selecting unit 186 selects a communication device located nearest the communication device 20 of the transmission source as a data transmission destination device (step S410). On the other hand, if only one other communication device is located at least near the straight line L2, the selecting unit 186 selects the other communication device as the data transmission destination device (step S412).

According to the transmission destination selection process related to the modified example, the user can intuitively transmit data provided in the communication device to another communication device as if the data were dropped due to gravity.

<5. Summary>

Up to now, the communication devices 20 and the communication control device 100 according to the embodiments of the present invention and the modified examples of the communication control device 100 have been described in detail with reference to FIGS. 1 to 18. According to the communication control device 100, an environment map including a plurality of objects corresponding to a plurality of communication devices 20 is dynamically built on the basis of input images obtained by imaging a real space. If a user input to a communication device 20 of a data transmission source is detected, designated data is transmitted to a data transmission destination device selected from the environment map on the basis of a direction designated by the user input. Alternatively, the data transmission destination device can be selected on the basis of a direction of gravity work in place of a direction designated by a user input. Thereby, the user can intuitively perform various types of data transmission from a PC to a printer, from a digital camera to a PC, and from a mobile terminal to a PC by a simple user input (for example, simple and easy manipulation such as a drag, a click, or the like) to the transmission source device.

A device selected as the data transmission destination may be a device located in the direction designated by the user input or the direction in which gravity works with respect to the data transmission source device in the environment map. The communication control device 100 selects the data transmission destination device on the basis of information such as a position of the data transmission source device in the environment map. That is, it is possible to provide an intuitive user interface corresponding to a positional relationship of communication devices by utilizing selection of data transmission destination device with application of the environment map. At this time, if a plurality of communication devices are present in the designated direction or the direction in which gravity works, the communication control device 100 can select a device located nearest the data transmission source device as the data transmission destination. That is, the data transmission destination can be uniquely selected even in an environment where the plurality of communication devices are present by applying a corresponding environment map to a real space.

The communication control device 100 may cause the display device to display an animation representing data transmission when data is transmitted from the device of the data transmission source to the device of the data transmission destination. The communication control device 100 can enable the user to easily know devices to/from which data is transmitted by displaying the animation on the basis of positions of the data transmission source device and the data transmission destination device in the environment map.

In this specification, an example in which the communication device 20 and the communication control device 100 are physically configured in separate bodies has been mainly described. However, various functions of the communication control device 100 excluding the camera and the HMD may be mounted in the physically same device as the communication device 20 of the data transmission source.

The set of processes by the communication device 20 and the communication control device 100 described in this specification is typically realized using software. For example, a program configuring the software, which realizes the set of processes, is stored in advance in a storage medium inside or outside each device. For example, each program is read to a random access memory (RAM) of each device upon execution, and is executed by a processor such as a CPU or the like.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2010-022973 filed in the Japan Patent Office on Feb. 4, 2010, the entire content of which is hereby incorporated by reference.

What is claimed is:

1. A communication control device comprising:
a data storage unit storing feature data representing features of appearances of one or more communication devices;
an environment map building unit of the communication control device configured to build an environment map representing positions of the one or more communication devices present in a real space on the basis of an input image obtained by imaging the real space and the feature data stored in the data storage unit, wherein the imaging the real space comprises receiving image data in substantially real-time from at least one camera;
a detecting unit of the communication control device configured to detect a user input toward a first communication device designating data provided in the first communication device and a direction based on the substantially real-time imaging from the at least one camera;
a selecting unit of the communication control device configured to select a second communication device serving as a transmission destination of the designated data from the environment map on the basis of the direction designated by the user input; and
a communication control unit of the communication control device configured to transmit the data provided in the first communication device from the first communication device to the second communication device.

2. The communication control device according to claim 1, wherein the selecting unit selects the second communication device if the second communication device is located in the direction designated by the user input with respect to the first communication device in the environment map.

3. The communication control device according to claim 2, wherein the selecting unit specifies one straight line having a start point at the first communication device on the basis of a position and a posture of the first communication device in the environment map and the direction designated by the user input, and selects a communication device located at least near the straight line as the second communication device.

4. The communication control device according to claim 2, wherein if the one or more communication devices are located in the direction designated by the user input with respect to the first communication device in the environment map, the selecting unit selects the second communication device if the second communication device is located closest to the first communication device among the one or more communication devices.

5. The communication control device according to claim 1, further comprising a display control unit of the communication control device which causes a display device to display an animation representing data transmission when the data is transmitted from the first communication device to the second communication device.

6. The communication control device according to claim 1, wherein the user input is dragging an icon displayed on a screen provided in the first communication device and the data to be transmitted from the first communication device is specified according to which icon is dragged by a user.

7. The communication control device of claim 5, wherein the animation is a three dimensional animation.

8. The communication control device of claim 7, wherein the three dimensional animation is superimposed over a two dimensional image displayed on the display device.

9. The communication control device of claim 8, wherein the three dimensional animation is rendered by a head mounted display.

10. The communication control device of claim 9, wherein the head mounted display comprises at least one of the at least one camera.

11. The communication control device of claim 8, wherein the three dimensional animation is rendered from the display device.

12. A communication control method by a communication control device including a storage medium storing feature data representing features of appearances of one or more communication devices, comprising the steps of:
building an environment map representing positions of communication devices present in a real space on the basis of an input image obtained by imaging the real space and the feature data, wherein the imaging the real space comprises receiving image data in substantially real-time from at least one camera;
detecting a user input toward a first communication device designating data provided in the first communication device and a direction based on the substantially real-time imaging from the at least one camera;
selecting a second communication device serving as a transmission destination of the designated data from the environment map on the basis of the direction designated by the user input; and
transmitting the data provided in the first communication device from the first communication device to the second communication device.

13. A non-transitory computer-readable medium having embodied thereon a program, which when executed by one or more communication devices, causes the one or more communication devices to function as:
an environment map building unit of the one or more communication devices configured to build an environment map representing positions of the one or more communication devices present in a real space on the basis of an input image obtained by imaging the real space and feature data stored in a data storage unit, wherein the imaging the real space comprises receiving image data in substantially real-time from at least one camera;
a detecting unit of the one or more communication devices configured to detect a user input toward a first communication device designating data provided in the first communication device and a direction based on the substantially real-time imaging from the at least one camera;
a selecting unit of the one or more communication devices configured to select a second communication device serving as a transmission destination of the designated data from the environment map on the basis of the direction designated by the user input; and
a communication control unit of the one or more communication devices configured to transmit the data provided in the first communication device from the first communication device to the second communication device.

14. A communication control device comprising:
a data storage unit storing feature data representing features of appearances of one or more communication devices;
an environment map building unit of the communication control device configured to build an environment map representing positions of communication devices present in a real space on the basis of an input image obtained by imaging the real space and the feature data stored in the data storage unit, wherein the imaging the real space comprises receiving image data in substantially real-time from at least one camera;
a detecting unit of the communication control device configured to detect a user input toward a first communication device designating data provided in the first communication device;
a selecting unit of the communication control device configured to select a second communication device serving as a transmission destination of the designated data from the environment map on the basis of a position of the first communication device in the environment map; and
a communication control unit of the communication control device configured to transmit the data provided in the first communication device from the first communication device to the second communication device.

15. The communication control device according to claim 14, wherein the selecting unit selects a communication device located below the first communication device in the environment map as the second communication device.

16. A communication control method by a communication control device including a storage medium storing feature data representing features of appearances of one or more communication devices, comprising the steps of:
building an environment map representing positions of communication devices present in a real space on the basis of an input image obtained by imaging the real space and the feature data, wherein the imaging the real space comprises receiving image data in substantially real-time from at least one camera;
detecting a user input toward a first communication device designating data provided in the first communication device;
selecting a second communication device serving as a transmission destination of the designated data from the environment map on the basis of a position of the first communication device in the environment map; and
transmitting the data provided in the first communication device from the first communication device to the second communication device.

17. A non-transitory computer-readable medium having embodied thereon a program, which when executed by one or more communication devices, causes the one or more communication devices to function as:
- an environment map building unit of the one or more communication devices configured to build an environment map representing positions of communication devices present in a real space on the basis of an input image obtained by imaging the real space and feature data stored in a data storage unit, wherein the imaging the real space comprises receiving image data in substantially real-time from at least one camera;
- a detecting unit of the one or more communication devices configured to detect a user input toward a first communication device designating data provided in a first communication device;
- a selecting unit of the one or more communication devices configured to select a second communication device serving as a transmission destination of the designated data from the environment map on the basis of a position of the first communication device in the environment map; and
- a communication control unit of the one or more communication devices configured to transmit the data provided in the first communication device from the first communication device to the second communication device.

* * * * *